United States Patent
Pollet et al.

(10) Patent No.: US 12,516,762 B2
(45) Date of Patent: Jan. 6, 2026

(54) FLUIDIC COUPLING ELEMENT AND ASSOCIATED FLUIDIC COUPLING

(71) Applicant: STAUBLI FAVERGES, Faverges-Seythenex (FR)

(72) Inventors: Valentin Pollet, Annecy-le-Vieux (FR); Frédéric Morel, Lathuile (FR); Christophe Durieux, Gilly sur Isere (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 0 days.

(21) Appl. No.: 18/770,449

(22) Filed: Jul. 11, 2024

(65) Prior Publication Data

US 2025/0020253 A1    Jan. 16, 2025

(30) Foreign Application Priority Data

Jul. 12, 2023  (FR) ...................................... 2307467

(51) Int. Cl.
*F16L 37/23* (2006.01)
*F16L 37/34* (2006.01)

(52) U.S. Cl.
CPC ............... *F16L 37/23* (2013.01); *F16L 37/34* (2013.01)

(58) Field of Classification Search
CPC .................................. F16L 37/23; F16L 37/34
See application file for complete search history.

(56) References Cited

U.S. PATENT DOCUMENTS

| | | | | |
|---|---|---|---|---|
| 2,708,589 A | * | 5/1955 | Masek | F16L 37/23 251/149.6 |
| 4,086,939 A | * | 5/1978 | Wilcox | F16L 37/34 251/149.6 |
| 4,289,164 A | * | 9/1981 | Ekman | F16L 37/23 137/614.03 |

(Continued)

FOREIGN PATENT DOCUMENTS

| CN | 107906289 A | * | 4/2018 | ............. F16L 37/23 |
|---|---|---|---|---|
| DE | 2333620 A1 | * | 1/1975 | |

(Continued)

OTHER PUBLICATIONS

Search Report issued in FR 2307467, dated Dec. 14, 2023.

*Primary Examiner* — David Colon-Morales
(74) *Attorney, Agent, or Firm* — MARSHALL, GERSTEIN & BORUN LLP

(57) ABSTRACT

The fluidic coupling member includes a body defining an internal conduit configured to accommodate a mating endpiece. The body includes a proximal part, which is in one-piece and delimits a proximal part of the internal conduit, and a distal part which is in one-piece, which defines a proximal part of the internal conduit and is fitted into the proximal part in an assembled configuration of the body. The proximal part includes an internal groove whereas the distal part includes an external groove that radially faces the internal groove at least partially when the body is in the assembled configuration. The fluidic coupling element further includes an obstacle which is elastically deformable and which, in the assembled configuration of the body, is partially accommodated in the external groove and in the internal groove so as to prevent the separation of the distal and proximal parts.

15 Claims, 14 Drawing Sheets

(56) References Cited

U.S. PATENT DOCUMENTS

| | | | | |
|---|---|---|---|---|
| 4,815,495 | A * | 3/1989 | Remsburg | F16L 37/23 251/126 |
| 4,892,117 | A * | 1/1990 | Spalink | F16L 37/23 137/614.03 |
| 4,896,697 | A * | 1/1990 | Stromdahl | F16L 37/34 137/614 |
| 4,949,745 | A | 8/1990 | McKeon | |
| 5,240,023 | A * | 8/1993 | Shelef | F16L 37/38 251/149.6 |
| 6,371,443 | B1 * | 4/2002 | Imai | F16L 37/35 137/614.04 |
| 6,681,803 | B2 * | 1/2004 | Taneya | F16L 37/23 251/149.6 |
| 6,776,187 | B1 | 8/2004 | Marquis et al. | |
| 6,779,778 | B2 * | 8/2004 | Kuwabara | F16L 37/46 285/86 |
| 7,213,845 | B2 * | 5/2007 | Sato | F16L 37/34 285/85 |
| 7,661,725 | B2 * | 2/2010 | Kouda | F16L 37/23 285/318 |
| 8,205,914 | B2 * | 6/2012 | Chappaz | F16L 37/32 285/276 |
| 8,256,803 | B2 * | 9/2012 | Takahashi | F16L 37/34 285/86 |
| 8,628,119 | B2 * | 1/2014 | Hasunuma | F16L 37/34 285/276 |
| 9,476,528 | B2 * | 10/2016 | Tiberghien | F16L 21/08 |
| 9,958,101 | B2 * | 5/2018 | Gennasio | F16L 37/34 |
| 10,094,502 | B2 * | 10/2018 | Tiberghien | F16L 37/34 |
| 10,767,800 | B2 * | 9/2020 | Laufer | F16L 37/23 |
| 11,486,528 | B2 * | 11/2022 | Nick | F16L 37/23 |
| 11,530,768 | B2 * | 12/2022 | Wada | F16L 37/32 |
| 12,253,199 | B2 * | 3/2025 | Gong | H05K 7/20818 |
| 2017/0307122 | A1 * | 10/2017 | Imoto | F16L 37/22 |
| 2020/0363000 | A1 * | 11/2020 | Tiberghien | F16L 37/22 |
| 2023/0213128 | A1 * | 7/2023 | Kuo | F16L 37/38 285/305 |

FOREIGN PATENT DOCUMENTS

| | | | | |
|---|---|---|---|---|
| DE | 30 23 377 | A1 | 1/1982 | |
| DE | 26 26 668 | C2 | 11/1986 | |
| EP | 2 674 658 | A1 | 12/2013 | |
| EP | 3739253 | A1 * | 11/2020 | F16L 37/23 |
| KR | 20100112182 | A * | 10/2010 | F16L 37/23 |
| SE | 465793 | B * | 10/1991 | F16L 37/60 |
| WO | WO-9719289 | A1 * | 5/1997 | F16L 37/28 |
| WO | WO-2014087187 | A1 * | 6/2014 | F16L 37/23 |
| WO | WO-2021018759 | A1 * | 2/2021 | F16L 37/23 |

* cited by examiner

FLUIDIC COUPLING ELEMENT AND ASSOCIATED FLUIDIC COUPLING

FIELD

The present invention relates to a fluidic coupling element configured to be assembled to a mating end-piece, and a fluidic coupling comprising such a coupling element and a mating end-piece.

BACKGROUND

EP-2 674 658 A1 describes e.g. a fluidic coupling comprising a locking ring moved upon coupling by actuating balls with a diameter greater than the diameter of the locking balls. The fluidic coupling element is only partially described. No details are given as to the structure of the body and no closing device is present.

DE 30 23 377 A1 describes an automatic fluidic coupling with a fluidic coupling element comprising a body providing elongated housings 17, intended to accommodate actuating balls 17'. The actuating balls 17' are then held in place by a locking ring, which cooperates with a cap 18 and an elastic ring 19, the locking ring, the cap and the elastic ring being mounted by the front of the fluidic coupling element. The cap and the elastic ring are exposed to shocks and may be damaged prematurely. Moreover, such a structure requires the fluidic coupling element to be lengthened forwards, so as to leave sufficient radial space for the cap 18, which makes same a not very compact solution. In addition, the cap is an additional part. No closing device is described.

U.S. Pat. No. 4,949,745 A describes a connecting element made up of several elements stacked together and held in position by an elastic ring and washers.

SUMMARY

It is to these problems that the invention more particularly seeks to remedy, by proposing a quick fluidic coupling that is at the same time sealed in an uncoupled configuration, compact and simple.

The fluidic couplings are fluidic coupling devices comprising a fluidic coupling element and an associated mating end-piece, which form a female element and a male element, respectively, of the fluidic coupling. Each among the fluidic coupling element and the end-piece includes an internal passage, the respective internal passages being in fluidic communication when the coupling is in the coupled configuration. The fluidic coupling element comprises a locking device, which can be automatically engaged when the mating end-piece is engaged with the coupling element, so as to maintain the coupling in the coupled configuration. Such a fluidic coupling is sometimes simply called an automatic coupling. An unlocking device, usually a ring, is provided to release the locking device and allow the fluidic coupling element to be uncoupled from the mating end-piece.

In general, it is preferable to have fluidic couplings that are as compact as possible. In addition, in certain applications, e.g. for cooling pipes of computer servers, it is essential that the fluidic coupling element is closed when the fluidic coupling is in the uncoupled configuration, e.g. by means of a closing device.

For this purpose, the invention relates to a fluidic coupling element, configured to be coupled to a mating end-piece, the fluidic coupling element comprising:

a body defining an internal conduit, the internal conduit extending along a central axis and being configured to accommodate the mating end-piece through a front mouth of the body, at least one locking ball, each locking ball being accommodated, respectively, in a respective first housing in the body and being radially movable between:

a locking position, wherein the or each locking ball protrudes into the internal conduit and is apt to retain the mating end-piece in the body, and a release position, wherein the or each locking ball does not prevent the removal of the mating end-piece from the body, a locking ring, which is mounted around the body and which comprises a locking surface facing the central axis, the locking ring being longitudinally movable with respect to the body between:

an advanced retaining position, wherein the locking surface holds each locking ball in the locking position, and a retracted unlocking position, wherein each locking ball is free to move toward the release position, a locking spring, which pushes the locking ring back to the advanced retaining position.

According to the invention, the body comprises:

a proximal part defining a proximal portion of the internal conduit and a rear ending intended for being coupled to a pipe, and a distal part, which is in one-piece and delimits:

a distal part of the internal conduit and the front mouth, and the first housings, whereas the proximal part is configured to be assembled to the distal part by fitting the distal part into the proximal part, in an assembled configuration of the body wherein no surface of the proximal part faces longitudinally rearwards a surface of the distal part, the fluidic coupling element further comprises a piston, a valve and a valve spring, which are housed in the internal conduit, the piston comprising a proximal collar flange which is longitudinally interposed between the distal part and the proximal part, whereas the valve is movable relative to the piston between:

a front closing position, wherein the valve closes the internal conduit, and a rear opening position, wherein the valve permits the passage of fluid into the internal conduit, the valve spring pushing the valve back toward the front closing position, the proximal part comprises an internal groove and the distal part comprises an external groove that at least partially faces radially the internal groove when the body is in the assembled configuration, and that the fluidic coupling element further comprises an obstacle, which is elastically deformable and which, when the body is in the assembled configuration, is partially accommodated in the external groove of the distal part and in the internal groove of the proximal part, the obstacle being configured to cooperate with a distal axial wall of the internal groove and a proximal axial wall of the external groove so as to prevent the separation of the distal and proximal parts.

By means of the invention, the assembly of the two proximal and distal parts of the body is done by means of an elastically deformable segment/obstacle, and the body of the coupling element, and by extension the fluidic coupling, is radially compact, more particularly more compact than if the proximal and distal parts were screwed to each other. The elastic obstacle is partially housed in the external groove of the distal part and partially in the internal groove of the proximal part and is protected from external shocks, the coupling element and the associated fluidic coupling being thereby more durable. The piston and the valve seal the fluidic coupling element in the uncoupled configuration.

According to advantageous but non-mandatory aspects of the invention, such a fluidic coupling element can incorporate one or a plurality of the following features, taken individually or according to any technically permissible combination.

The fluidic coupling element comprises at least one actuating ball, each actuating ball being respectively accommodated in a second housing in the distal part and being apt to be pushed back into the respective second housing, by the mating piece during the coupling of the fluidic coupling element and of the mating end-piece, so as to move the locking ring longitudinally against the locking spring:

from the advanced retaining position, where the locking ring limits the movement of each actuating ball to a position where each actuating ball protrudes radially on either side of the body and the locking ring abuts forward against at least one actuating ball or against the body, a front surface of the locking ring oriented towards the front of the body facing the actuating ball or each actuating ball longitudinally, towards the retracted unlocked position.

Each second housing has an elongated shape parallel to the central axis, such that each actuating ball is movable in the respective second housing during the coupling of the fluidic coupling element and of the mating end-piece, following a movement comprising a longitudinal component and a radial component to the central axis.

In the free state, the obstacle has a larger external maximum radial dimension than in the assembled configuration of the body.

The obstacle is apt to be completely contained in the external groove.

When the obstacle is in contact with the distal axial wall of the internal groove, the obstacle is in external contact only with a cylindrical bottom surface of the internal groove, whereas in the assembled configuration of the body, the proximal collar flange of the piston is configured to limit the approach of the distal part and the proximal part to a configuration where the obstacle is in external contact only with the cylindrical bottom surface of the internal groove.

The obstacle is a ring, the longitudinal dimension of which is strictly greater than a radial thickness of the ring in the free state, preferably at least three times greater.

The obstacle is a split ring.

No surface of the locking ring faces longitudinally rearward a surface of the distal part. In the advanced retaining position, the locking ring is directly or indirectly in front abutment against the body. A distal wall of the external groove is shifted rearwards relative to a rear end surface of the locking ring when the locking ring is in an advanced retaining position.

The fluidic coupling element comprises a first seal radially interposed between the distal part and the proximal part, whereas the obstacle is arranged forward with respect to the first joint in the assembled configuration of the body.

The fluidic coupling element comprises:
a spacer ring, which is longitudinally interposed between the distal part and the proximal collar flange of the piston and engaged with reduced radial play in the distal part, a second seal, which cooperates with the valve in the closing position, and which is housed in a second sealing housing delimited by:
a distal wall of the distal part,
a bottom surface of the distal part, and
a front axial end surface of the spacer ring.

The piston comprises, in addition to the proximal collar flange, a distal head which is radially opposite the valve in the front closing position, a third seal being interposed radially between the distal head and the valve in the front closing position, whereas the piston is in one-piece, and
the valve has a minimum internal radial dimension that is greater than a maximum external radial dimension of the distal head.

The distal part comprises at least:
a first external radial surface, at which the first housings open out, and
a second external radial surface, wherein the external groove is formed, the second external radial surface being located rearward of the first external radial surface and having a diameter strictly smaller than a diameter of the first external radial surface,
whereas the maximum external dimension of the obstacle in the assembled configuration of the body is strictly smaller than a diameter of the first external radial surface.

The proximal part defines at least a first internal radial surface at which the internal groove is formed, whereas a longitudinal dimension of the internal radial surface ahead of the internal groove is greater than a length of the external groove.

The locking ring is partially arranged about the proximal part of the body, whereas the spring of the locking ring is interposed between the proximal part and the locking ring.

The invention further relates to a fluidic coupling, comprising:
a fluidic coupling element such as described hereinabove, and
an additional end-piece,
wherein the mating end-piece comprises:
a locking groove is suitable for accommodating each locking ball in a locking position in the coupled configuration of the fluidic coupling.

BRIEF DESCRIPTION OF THE DRAWINGS

The invention will be better understood and other advantages of the invention will appear more clearly in the light of the following description of two embodiments of a fluidic coupling element and of a fluidic coupling according to the principle thereof, given only as an example and made with reference to the enclosed drawings, wherein.

DESCRIPTION

Figure 2:
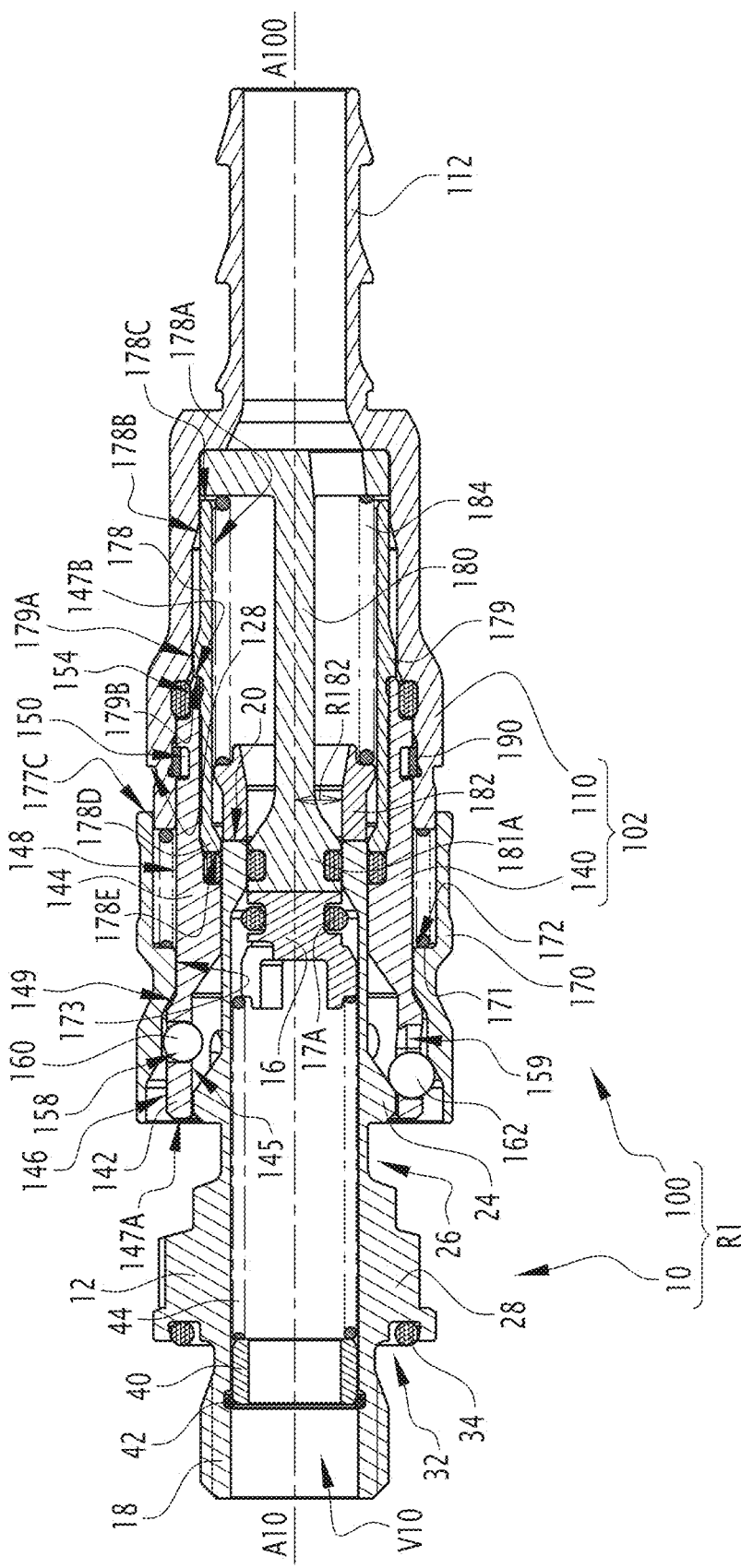
FIG. 2 is a broken-out section of the fluidic coupling shown in FIG. 1, shown in a first intermediate configuration during a coupling sequence of the fluidic coupling element and of the mating end-piece.
Figure 3:
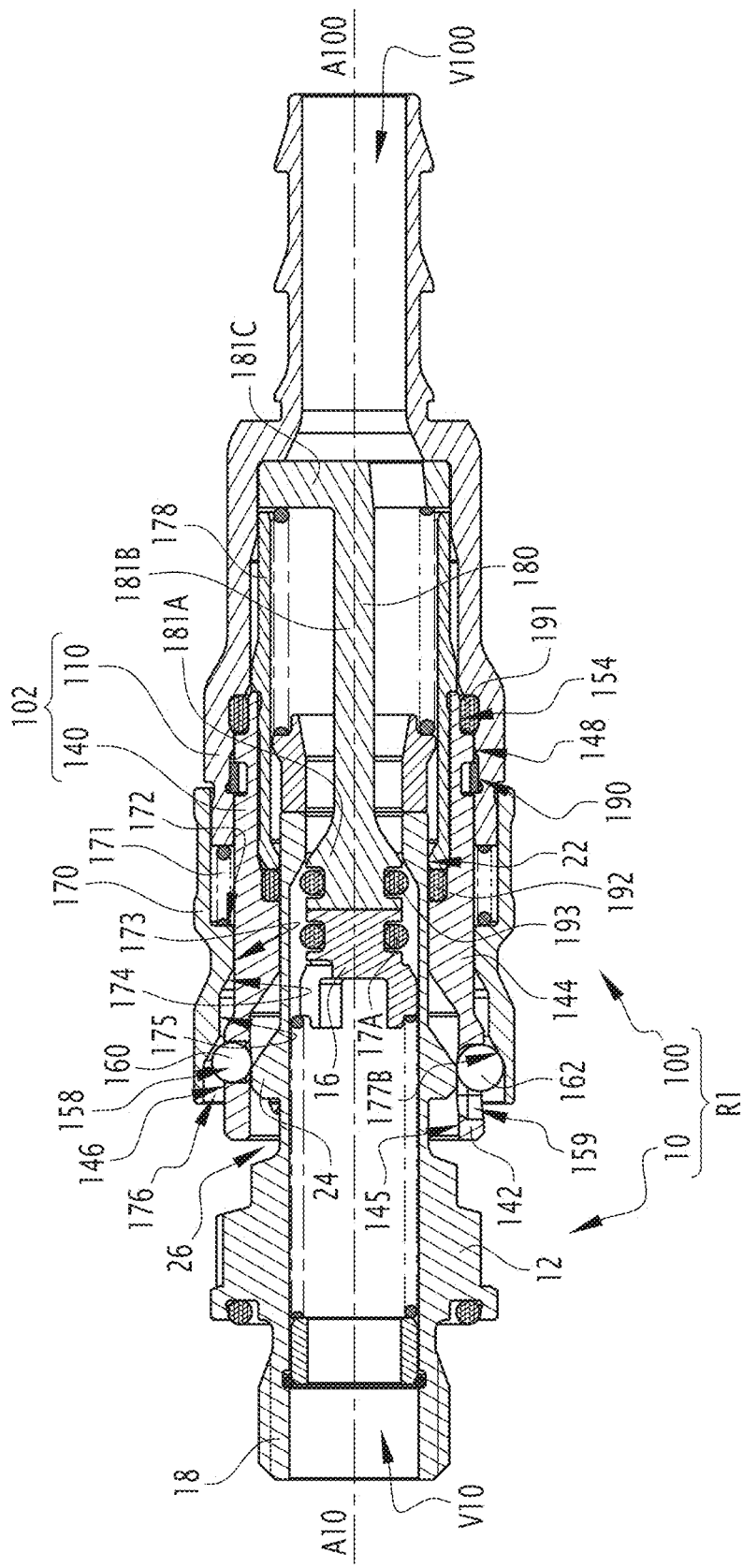
FIG. 3 is a broken-out section of the fluidic coupling shown in FIG. 1, shown in a second intermediate configuration during the mating sequence.
Figure 4:
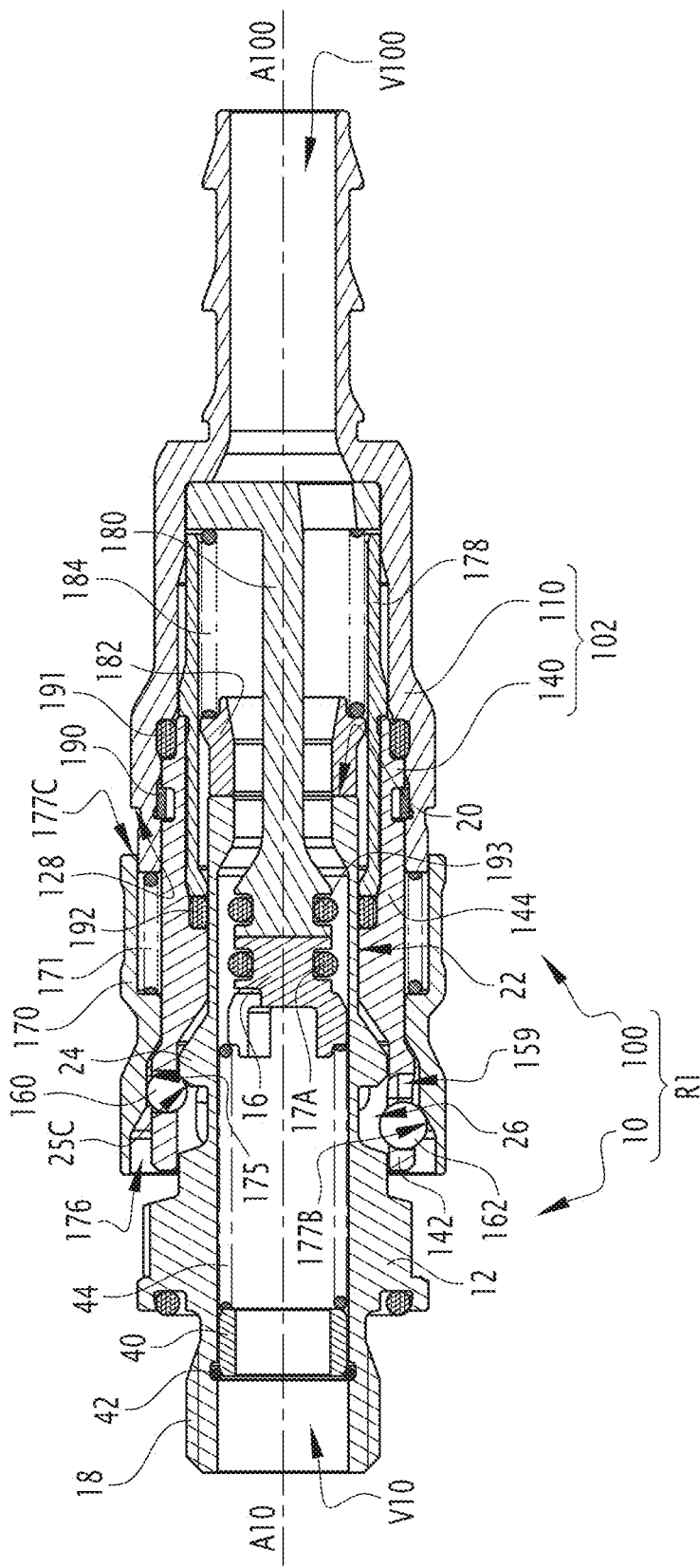
FIG. 4 is a broken-out section of the fluidic coupling shown in FIG. 1, shown in a coupled configuration.

A fluidic coupling R1, according to a first embodiment, is described with reference to FIGS. 1 to 7. With reference to insert a) of FIG. 1, the fluidic coupling R1 comprises a fluidic coupling element 100, located on the right-hand side of insert a), and a mating end-piece 10, located on the left-hand side of insert a). The fluidic coupling element 100, also called the female element, is configured to be coupled to the mating end-piece 10, also called the male element, according to a coupling sequence of the fluidic coupling R1 described with reference to FIGS. 2 to 4. At the end of the coupling sequence, the fluidic coupling R1 is in a coupled configuration, as shown in FIG. 4.

With reference to FIG. 1a, the fluidic coupling element 100 comprises a front side, which is oriented toward the mating end-piece 10 at the beginning of the coupling, and a rear side situated opposite the front side. The front side of the fluidic coupling element 100 is also a distal side of the fluidic coupling element 100, whereas the rear side is a proximal side of the fluidic coupling element 100. A front surface of the fluidic coupling member 100 is oriented toward the front side, whereas a rear surface of the fluidic coupling element 100 is oriented toward the rear side. Symmetrically, the mating end-piece 10 comprises a front side, which is oriented toward the fluidic coupling element 100 at the beginning of the coupling, and a rear side located opposite the front side. The front side of the mating end-piece 10 is also a distal side of the mating end-piece 10, whereas the rear side is a proximal side of the mating end-piece 10.

The mating end-piece 10 is first described.

The mating end-piece 10 has overall a shape of revolution about the axis A10. Unless otherwise stated, hereinafter in the description, the notions of "radial" or "axial" for a surface belonging to the mating end-piece 10 are given with reference to the main axis A10. In general, a so-called "axial" surface with respect to a given axis is a surface the normal of which is at every point parallel to the axis. In other words, an axial surface is a plane surface which is geometrically supported by a plane orthogonal to the axis. A radial surface is a surface the normal axis of which is at any point radial to the axis, in other words a cylindrical surface of circular cross-section centered on the axis.

Figure 1:
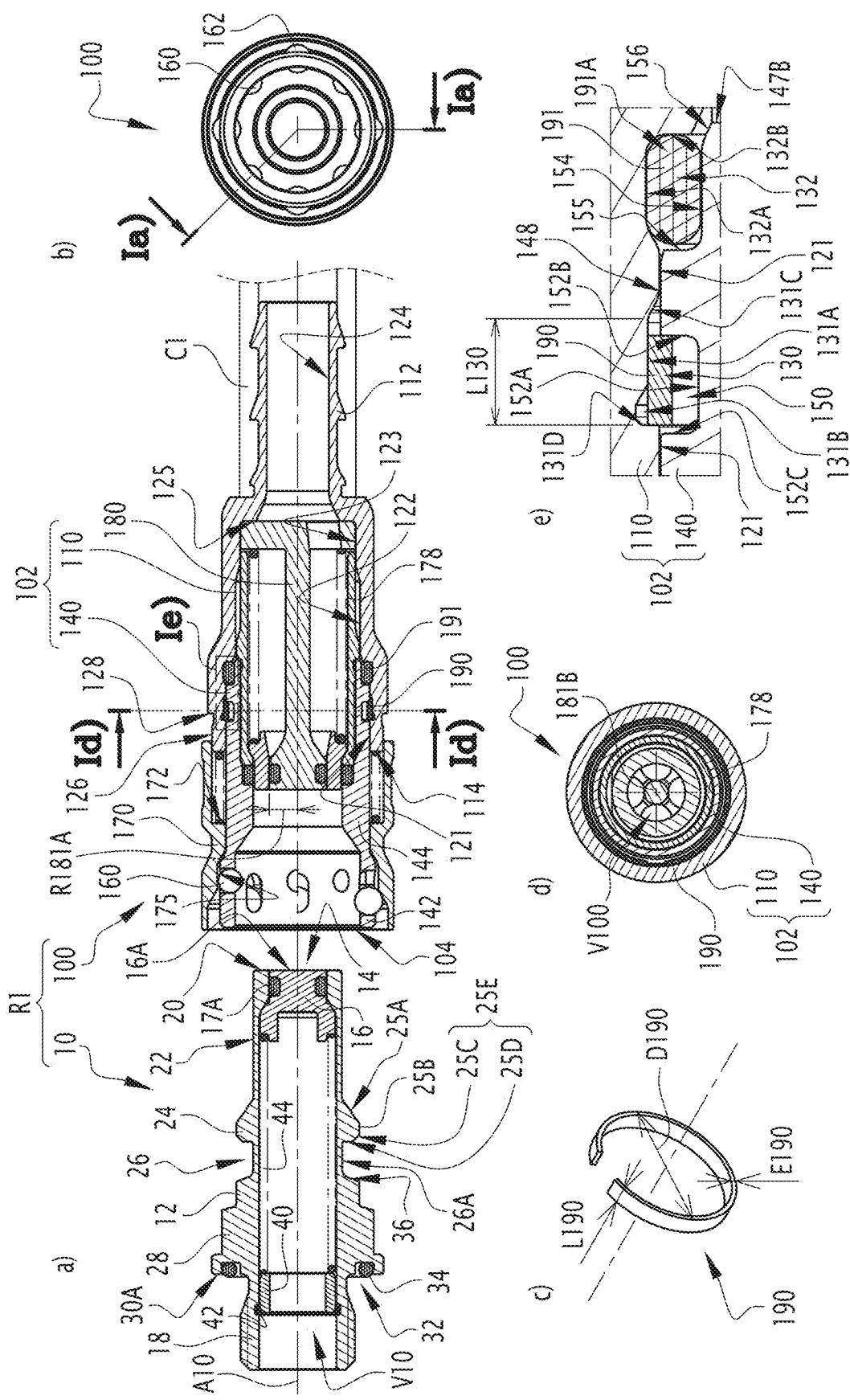
FIG. 1 shows, on five inserts (a) to (e), a plurality of views or details of a fluidic coupling according to a first embodiment of the invention, the insert (a) being a broken-out section of the fluidic coupling shown in an uncoupled configuration, the fluidic coupling comprising a fluidic coupling element and a mating end-piece.

The mating end-piece 10 comprises a male body 12 with tubular shape, which delimits an internal channel V10 extending along the main axis A10. The internal channel V10 opens out on the front side via a mouth 14, which in FIG. 1 is closed off by a movable check valve 16. The main axis A10 defines an internal side of the mating end-piece 10.

On the rear side, the male body 12 comprises a rear ending 18 into which the internal channel V10 opens out. The rear ending 18, which is provided for assembling the mating end-piece 10 to a support (not shown), is herein threaded. In a variant, the rear ending 18 can be connected to a pipe. In the example illustrated, the male body 12 comprises, on an external side of the male body 12 and from the front to the rear, a front end axial surface 20, which extends in a plane orthogonal to the main axis A10, a first substantially cylindrical portion which has an external radial end surface 22, an actuating collar flange 24 which protrudes with respect to the external radial end surface 22, an external locking groove 26, a second collar flange 28, and finally the rear ending 18.

The external locking groove 26 has a bottom surface 26A which herein has a cylindrical shape with a circular cross-section centered on the main axis A10. The external locking groove 26 is delimited by the actuating collar flange 24 on the front- or distal-side of the bottom surface 26A, and by the second collar flange 28 on the rear- or proximal-side of the bottom surface 26A.

The actuating collar flange 24 herein comprises, from the front to the rear, a frustoconical front surface 25A, which is centered on the main axis A10 and which diverges toward the rear of the male body 12, a cylindrical intermediate surface 25B centered on the main axis A10, an external frustoconical portion 25C, which is centered on the main axis A10 and which converges toward the rear of the male body 12, and an internal axial portion 25D, which has the shape of a ring situated in a plane orthogonal to the main axis A10. The frustoconical external portion 25C and the internal axial portion 25D together form a proximal wall 25E of the actuating collar flange 24. The proximal wall 25E thereby delimits, on the distal side, the external locking groove 26.

The second collar flange 28 has herein a rear face 30A which extends radially to the main axis A10 and which is arranged around the rear end 18. A front groove 32 is recessed in the rear face 30A, the front groove 32 accommodating a seal 34 for the sealed mounting of the rear ending 18 on the support. The second collar flange 28 has, on the front side, a proximal wall 36 which is inclined herein and which delimits the external locking groove 26 on the proximal side.

The mating end-piece 10 further comprises an internal ring 40, a circlip 42 and a spring 44. The internal ring 40 is mounted in the internal channel V10 of the male body 12 and is locked, at the rear in the male body 12, by the circlip 42. The spring 44 is interposed between the check valve 16 and the internal ring 40, so as to push the internal ring 40 rearwards into abutment against the circlip 42, and to push the check valve 16 towards the front of the mating end-piece 10. In the example shown in FIG. 1, the check valve 16 is pushed forwards into abutment against a narrowed section of the mouth 14, the check valve 16 being in a closing position.

The check valve 16 is accommodated in the internal channel V10 and is movable in translation relative to the male body 12 along the main axis A10 between the closing position, wherein the check valve 16 seals the internal channel V10, and a retracted opening position. To this end, the mating end-piece 10 advantageously comprises a seal 17A which is accommodated in a radial groove formed in the check valve 16. The seal 17A is thereby interposed radially between the male body 12 and the check valve 16 in the closing position.

In other words, in the closing position of the internal channel V10, the check valve 16 is in front abutment against the male body 12 and cooperates in leak-tight manner with the male body 12. When the check valve 16 is pushed back toward the rear of the male body 12 against the spring 44 and the passage of the fluid into the internal channel V10 is no longer prevented, the check valve 16 is in the so-called retracted opening position. When the check valve 16 is in the closing position, a front axial end surface 16A of the check valve 16 and the front axial end surface 20 of the male body 12 are aligned, i.e. are substantially geometrically supported by the same plane, which is herein orthogonal to the main axis A10.

Preferably, the mating end-piece 10 is as per the so-called UQD specifications, an acronym for "Universal Quick Disconnect" established by Intel Corporation.

The fluidic coupling element 100 will now be described.

The fluidic coupling element 100 has overall a shape of revolution about a central axis A100. Unless otherwise stated, hereinafter in the description, for a surface belonging to the fluidic coupling element 100, the notions of "radial", "axial" or "longitudinal" are made with reference to the central axis A100. The central axis A100 is thereby a longitudinal axis of the fluidic coupling element 100. A direction or an "internal side" of the fluidic coupling element 100 is turned toward the central axis A100, the notions of "external", "outward" being made with reference to a radial direction moving away from the central axis A100.

The fluidic coupling element 100 comprises a body 102 which delimits an internal conduit V100, the internal conduit V100 of the fluidic coupling element 100 extending along the central axis A100, being configured to accommodate the mating end-piece 10 via a front opening 104 of the body 102. Thereby, the internal conduit V100 is also a volume for accommodating the mating end-piece 10. The body 102 is also called the "female body". When the mating end-piece 10 is accommodated in the fluidic coupling element 100 in the coupled configuration, as shown in FIG. 4, the central axis A100 is aligned with the main axis A10, and the internal channel V10 of the mating end-piece 10 is fluidically connected to the internal conduit V100 of the fluidic coupling element 100.

The body 102 comprises herein two parts, which are assembled together. The body 102 thereby comprises a proximal part 110, which delimits a proximal portion of the internal conduit V100 and which has a rear ending 112, which is herein intended to be connected to a pipe C1. The pipe C1 is not part of the R1 fluidic coupling but is used to specify the context of use. The proximal part 110 is in one-piece. The body 102 further comprises a distal part 140, which is in one-piece and which delimits a distal portion of the internal conduit V100, the distal portion opening out to the front via the front mouth 104 for accommodating the mating end-piece 10. In other words, a front portion of the body 02 is formed exclusively by the distal part 140 whereas a rear portion of the body 102 is formed exclusively by the proximal part 110, the proximal portion of the distal part 140 and the distal portion of the proximal part 110 radially overlapping for the assembly of the proximal 110 and distal 140 parts.

The proximal part 110 is configured to be assembled to the distal part 140 by fitting the distal part 140 with the proximal part 110, more particularly in the proximal part 110, in an assembled configuration of the body 102, the assembly of the proximal part 110 to the distal part 140 being locked by an elastically deformable obstacle. In the first embodiment, the obstacle is a split ring 190, shown in FIG. 1c). Split ring means that the ring comprises a slot which passes through the ring throughout the radial thickness thereof and throughout the length thereof, the split ring therefore being discontinuous about the axis X100 when the body 102 is in the assembled configuration.

On the front side, the proximal part 110 has a front end axial surface 114, which herein has the shape of a ring and extends in a plane orthogonal to the central axis A100. The proximal part 110 comprises an internal surface which is oriented toward the central axis A100 and which extends from the front axial end surface 114. Thereby, the internal surface of the proximal part 110 comprises, from the front to the rear, a first internal radial surface 121, a second internal radial surface 122, a third internal radial surface 123 and a fourth internal radial surface 124.

The first, second, third and fourth internal radial surfaces 121 to 124 are connected in pairs by chamfers and/or axial surfaces, i.e. surfaces parallel to a plane orthogonal to the central axis A100. The fourth internal radial surface 124 is provided herein at the rear ending 112 of the proximal part 110.

Each of the first, second, third and fourth internal radial surfaces 121 to 124 is cylindrical with a circular cross-section centered on the central axis A100. The second internal radial surface 122 is situated rearwards from the first internal radial surface 121 and has an internal diameter smaller than the diameter of the first internal radial surface 121. The third internal radial surface 123 is situated rearwards from the second internal radial surface 122 and has an internal diameter smaller than the diameter of the second internal radial surface 122. The fourth internal radial surface 124 is situated rearwards from the third internal radial surface 123 and has an internal diameter smaller than the diameter of the third internal radial surface 123.

The fourth internal radial surface 124 is connected to the third internal radial surface 123 by means of a front axial stop 125.

On the external side, the proximal part 110 comprises a first external radial surface 126, which is a cylindrical surface opening forwards on the front axial end surface 114 of the proximal part 110, and an axial abutment surface 128 arranged at the rear of the first external radial surface 126.

In other words, the axial abutment surface 128 is set back from the front axial end surface 114.

The proximal part 110 comprises a first internal groove 130, which is provided recessed at the first internal radial surface 121. With reference to FIG. 1e), the first internal groove 130 comprises a bottom surface 131A which is cylindrical with a circular cross-section. Towards the front, the first internal groove 130 is delimited radially by a front play 131B with a radial dimension greater than the diameter of the bottom surface 131A. Towards the rear, the bottom surface 131A of the first internal groove 130 is connected to the first internal radial surface 121 by a chamfer 131C. The front play 131B is connected to the first internal radial surface 121 by a distal axial wall 131D which extends partially radially outwards, i.e. centrifugally to the central axis A100, beyond the bottom surface 131A. The chamfer 131C longitudinally faces the distal axial wall 131D, with the obstacle 190 interposed between the chamfer 131C and the distal axial wall 131D.

The proximal part 110 further comprises a second internal groove 132, which is provided recessed in the first internal radial surface 121 and which is arranged rearwards from the first internal groove 130. The second internal groove 132 comprises a bottom wall 132A which forms an internal radial surface of the proximal part 110 and which is delimited, at the rear, by an axial wall 132B.

The distal part 140 comprises, on the front side, a skirt 142 and, on the rear side, a sleeve 144. The skirt 142 has a tubular shape and comprises an internal surface 145 which is oriented toward the central axis A100 and which delimits the internal conduit V100, and an external surface which is oriented opposite the internal surface and which forms a first external radial surface 146 of the distal part 140. The skirt 142 comprises a front end surface 147A which is oriented forwards and which connects the internal surface 145 to the first external radial surface 146. The sleeve 144 comprises a rear axial end surface 147B which is oriented opposite from the front end surface 147A of the skirt 142.

The sleeve 144 comprises an external surface, which is situated rearwards from the first external radial surface 146, which has a cylindrical shape of circular cross-section and which forms a second external radial surface 148 of the distal part 140. The second external radial surface 148, which has a diameter smaller than a diameter of the first external radial surface 146, is herein connected by a chamfer 149 to the first external radial surface 146. The chamfer 149 is thereby a frustoconical surface, which is centered on the central axis A100 and which diverges toward the front of the fluidic coupling element 100.

The distal part 140 comprises an external groove 150 which is provided recessed in the second external radial surface 148. With reference to FIG. 1e), the external groove 150 comprises a bottom 152A and is delimited longitudinally by a proximal axial wall 152B and a distal axial wall 152C. The proximal axial wall 152B faces longitudinally the distal axial wall 152C, with the obstacle 190 interposed between the proximal axial wall 152B and the distal axial wall 152C. Rearwards from the second external radial surface 148 and from the external groove 150, the distal part 140 has a terminal external radial surface 154 which has a diameter smaller than the diameter of the second external radial surface 148. The second external radial surface 148 and the terminal external radial surface 154 are connected by a rear wall 155. The terminal external radial surface 154 is herein a cylindrical surface of circular cross-section, which opens out longitudinally onto a rear end surface 156 of the distal part 140. The rear end surface 156 is a substantially frustoconical chamfer which connects the external radial end surface 154 to the axial rear end surface 147B.

The distal part 140 and the proximal part 110 are assembled together without screwing, without bonding, without welding but by means of the split ring 190. The split ring 190 is shown in the free configuration—or free state—in FIG. 1c), i.e. that no external force—apart from gravity—is exerted on the split ring 190 and that the split ring 190 is not mounted in the distal 140 and proximal 110 parts. In FIG. 1e), the split ring 190 is accommodated in the first internal groove 130, which has an internal diameter slightly smaller than an external diameter D190 of the split ring 190 in the free configuration. The split ring 190 is thereby slightly compressed and thereby tends, by elastic return, to stay in external abutment against the bottom surface 131A of the first internal groove 130. Thereby, the internal diameter of the first internal groove 130 is smaller, e.g. on the order of 2%, than the external diameter D190 of the split ring 190 in the free configuration. In the example illustrated, the internal diameter of the first groove 130 is equal to 18.61 mm, whereas the external diameter D190 of the split ring 190 is equal to 18.97 mm.

Preferably, the compression spring 190 is made of a metallic material, more particularly of stainless steel. In a variant (not shown), the split ring 190 is made of a polymer material. The split ring 190 has a section taken in a longitudinal plane which is rectangular and constant on the periphery thereof, a length of the rectangle defining a longitudinal dimension L190 of the split ring 190, whereas a width of the rectangle defines a radial thickness E190 of the ring 190. The longitudinal dimension L190 is strictly greater than the radial thickness E190 of the split ring 190 in the free state, preferably at least three times greater. In the example shown, the length L190 is equal to 2.24 mm, whereas the radial thickness E190 is equal to 0.61 mm.

The radial thickness E190 is greater than a depth of the first internal groove 130 of the proximal part 110. The depth of the first internal groove 130 is equal to a difference between a radius of the bottom surface 131A and a radius of the first internal radial surface 121. Thereby, when the split ring 190 is accommodated in the first internal groove 130, the split ring 190 bears externally against the bottom surface 131A and protrudes inwardly from the first internal radial surface 121.

In the assembled configuration of the distal 140 and proximal 110 parts, the external groove 150 faces at least partially the internal groove 130 along a direction radial to the central axis A100. In other words, the external groove 150 opens out radially into the internal groove 130. The split ring 190 is housed partially in the external groove 150 of the distal part 140 and partially in the first internal groove 130 of the proximal part 110. Thereby, when the distal part 140 and the proximal part 110 tend to be separated from each other along the longitudinal direction, the split ring 190 cooperates with the distal wall 131D of the first internal groove 130 and the proximal axial wall 152B of the external groove 150, so as to go against the separation movement. The front recess 131B of the internal groove 130 ensures the surface cooperation between the split ring 190 and the distal wall 131D of the first internal groove 130.

The radial thickness E190 is less than a depth of the external groove 150 of the distal part 140 which is equal to a difference between a radius of the bottom 152A and a radius of the second external radial surface 148, to enable the proximal part 110 to be assembled to the distal part 140, as explained hereafter.

The fluidic coupling element 100 comprises a first seal 191 which is interposed radially between the distal part 140 and the proximal part 110 rearwards from the split ring 190. More precisely, the first seal 191 is accommodated in a first sealing housing 191A which is delimited, on the one hand, by the second internal groove 132 of the proximal part 110 and, on the other hand, by the rear wall 155 of the distal part 140 and the terminal external radial surface 154 of the distal part 140. The first housing 191A thus forms an "open groove". The split ring 190 is arranged at the front with respect to the first seal 191 in the assembled configuration of the body 102.

The distal part 140 comprises first housings, herein radial housings 158, and second housings, which are elongated housings 159 in the first embodiment of the invention. The radial housings 158 and the elongated housings 159 are provided through the skirt 142 radially to the central axis A100 and open out both on the internal surface 145 and on the first external radial surface 146 of the distal part 140. The radial housings 158 have herein a circular cross-section, whereas the elongated housings 159 have herein an oblong cross-section arranged parallel to the main axis A100. Each elongated housing 159 is delimited longitudinally by a distal wall and by a proximal wall, which are substantially aligned along a direction parallel to the central axis A100 and which limit the longitudinal movement of the actuating balls 162 with respect to the body 102. Preferably, the radial housings 158 and the elongated housings 159 are regularly distributed about the central axis A100, preferably alternately, so as to reduce the risks of blocking the fluidic coupling R1.

The fluidic coupling element 100 comprises at least one locking ball 160, each locking ball 160 being accommodated in a respective radial housing 158. When the fluidic coupling element 100 is assembled, as shown in the drawings, each locking ball 160 is captive in the associated radial housing 158, each radial housing 158 herein opening out onto the internal surface 145 via a narrowed opening, which has a minimum opening dimension smaller than a diameter of the associated locking ball 160. The fluidic coupling element 100 comprises a locking ring 170, which is in one-piece and which is arranged around the body 102, more particularly partially around the first and second external radial surfaces 146/148 of the distal part 140 and around the first external radial surface 126 of the proximal part 110, so as to limit the radial movement of the locking balls 160 on the side of the first external radial surface 146. The locking ring 170, which herein is partially arranged around the proximal part 110 of the body 102, is described hereinafter.

Each locking ball 160 is thus radially movable with respect to the body 102 between an internal radial locking position, wherein the locking ball 160 in question protrudes into the internal conduit V100 of the fluidic coupling element 100 and is apt to retain the mating end-piece 10 accommodated in the internal conduit V100, by engaging in the external locking groove 26, and an external radial release position, wherein the locking ball 160 in question resists the withdrawal of the mating end-piece 10 outside the internal conduit V100. Preferably, in the external radial release position, the locking balls 160 do not protrude into the internal conduit V100.

The fluidic coupling element 100 comprises at least one actuating ball 162, each actuating ball 162 being accommodated in a respective elongated housing 159. When the fluidic coupling element 100 is assembled, as shown in the drawings, each actuating ball 162 is captive in the associated elongated housing 159, each elongated housing 159 herein opening out onto the internal surface 145 via a narrowed opening, which has a minimum opening dimension smaller than a diameter of the associated actuating ball 162. In the assembled configuration of the body 102, on the side of the first external radial surface 146, the radial movement of the actuating balls 162 toward the outside is limited by the locking ring 170.

Each actuating ball 162 accommodated in the associated elongated housing 159 is thereby mobile, with respect to the body 102, radially and longitudinally with respect to the central axis A100.

The radial housings 158 and the elongated housings 159 retain the associated locking 160 or actuating 162 balls in the radial movement thereof toward the central longitudinal axis A100. Advantageously, the locking balls 160 are identical to each other, and the actuating balls 162 are identical to each other. Preferably, the actuating balls 162 have a diameter which is strictly greater than a diameter of the locking balls 160.

The locking ring 170 will now be described.

The locking ring 170 has a shape of revolution about the central axis A100 and cooperates with the body 102, in such a way that the locking ring 170 is movable in translation along the central axis A100, with respect to the body 102, and in particular with respect to the distal part 140. The fluidic coupling element 100 further comprises a locking spring 171, which is interposed herein between the locking ring 170 and the front axial end surface 114 of the proximal part 110 of the body 102, so as to push the locking ring 170 toward the front of the body 102. More precisely, the locking spring 171 bears against a rear abutment surface 172 of the locking ring 170, the rear abutment surface 172 being an axial surface oriented toward the rear. Such arrangement limits the radial size of the fluidic coupling element 100.

From the rear to the front, the rear abutment surface 172 is connected to an internal radial surface 173, which is situated radially opposite the second external radial surface 148 of the distal part 140 and which contributes to guiding the locking ring 170 in translation along the body 102.

The internal radial surface 173 is connected, toward the front, to an inclined surface 174, which is herein a frustoconical surface centered on the central axis A100 and which diverges toward the front of the fluidic coupling element 100.

The inclined surface 174 is connected, toward the front, to a locking surface 175, which is herein a cylindrical surface of circular cross-section centered on the central axis A100.

On the front side of the locking surface 175, the locking ring 170 comprises a groove 176 which is provided recessed with respect to the locking surface 175. The groove 176 herein comprises a bottom 177A with a cylindrical shape with a circular cross-section centered on the central axis A100, and a front surface 177B, which connects the locking surface 175 to the bottom 177A of the groove 176. The front surface 177B is inclined with respect to the radial and longitudinal directions of the body 102, and delimits the groove 176 on the rear. The front surface 177B is herein a frustoconical surface, which is centered on the central axis 100 and which diverges toward the front of the fluidic coupling element 100.

In the assembled configuration of the body 102, on the same side as the internal surface 145, the radial movement of the actuating balls 162 inwards is limited by the narrowed opening of the elongated housings 159, to a configuration wherein the front surface 177B is situated longitudinally facing the actuating balls 162. The front surface 177B is configured, in the advanced retaining position, to indirectly abut frontally against the body 102, i.e. to abut against the body 102 by means of the actuating ball or balls 162, which as such abut frontally against the distal wall of the elongated housings 159 of the distal part 140, thus limiting the forward translational movement of the locking ring 170 with respect to the body 102. The locking ring 170 is then in a so-called "advanced" retaining position, as illustrated in FIGS. 1, 2 and 4. The inclined surface 174 is then situated radially opposite the chamfer 149 of the distal part 140. The locking spring 171 thereby tends to push the locking ring 170 toward the advanced retaining position. When the locking ring 170 is in the advanced retaining position, the actuating balls 162 protrude radially on either side of the distal part 140 of the body. More precisely, the actuating balls 162 protrude radially on either side of the skirt 142 of the distal part 140. In other words, the actuating balls 162 are arranged partially in the accommodation volume V100 and partially in the groove 176 of the locking ring 170. The locking surface 175 radially covers and holds the locking balls 160 in the locking position.

Figure 5:
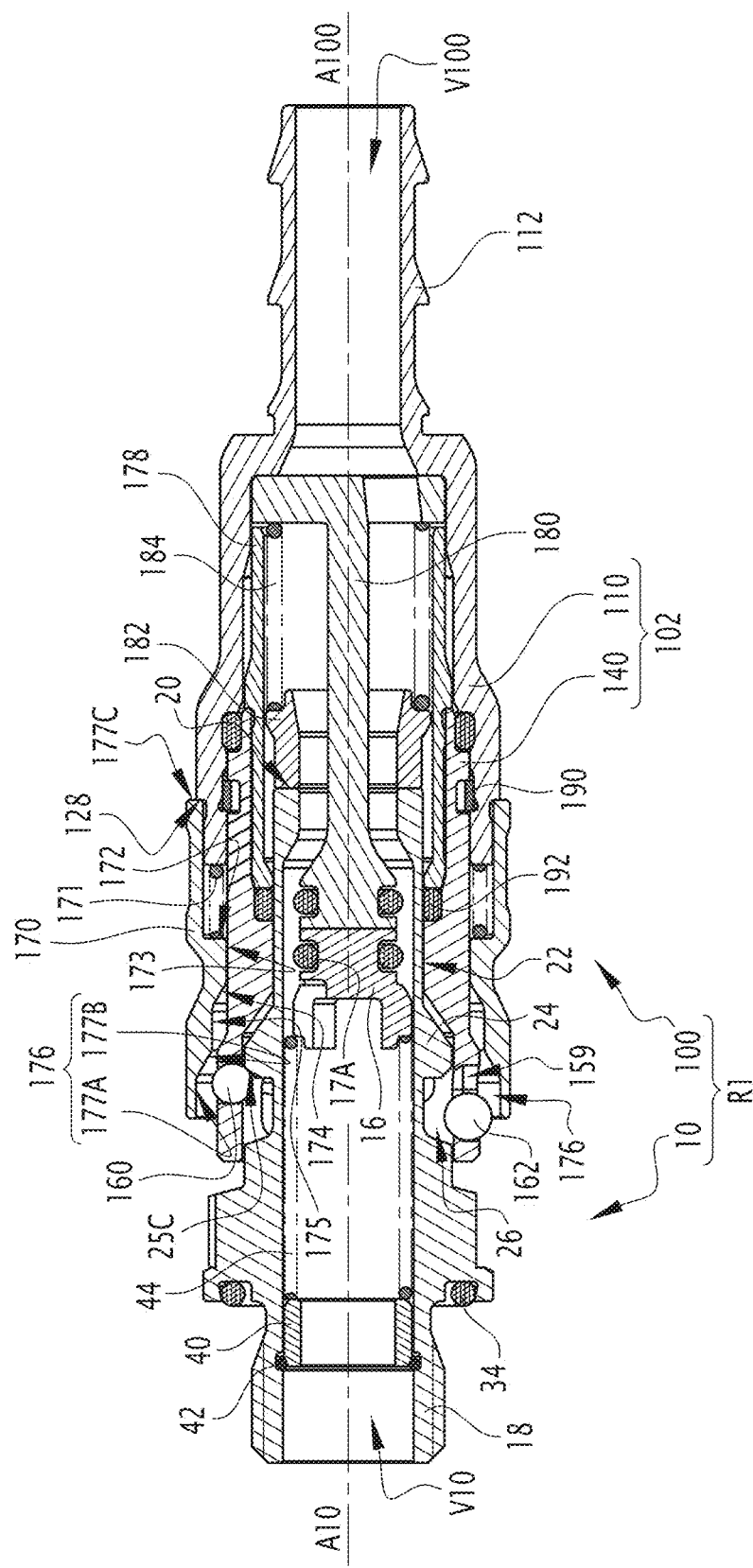
FIG. 5 is a broken-out section of the fluidic coupling shown in FIG. 1, shown in an unlocked configuration, during a sequence of uncoupling of the quick coupling.

From the advanced retaining position, the locking ring 170 can be moved rearwards, e.g. under the action of an operator directly moving the locking ring 170 rearwards against the locking spring 171, e.g. to uncouple the fluidic coupling R1. In the example illustrated in FIG. 5, the rearward movement of the locking ring 170 is limited by the rearward abutment of an axial rear end surface 177C of the locking ring 170 against the axial abutment surface 128 formed on the proximal part 110. In other words, the rear axial end surface 177C forms a rear abutment surface of the locking ring 170. When the locking ring 170 is in contact with the axial abutment surface 128, as can be seen in FIG. 5, the locking ring 170 radially covers the actuating balls 162 in such a way that the actuating balls 162 cannot be extracted completely from the elongated housings 159. It will be understood that during the longitudinal movement of the locking ring 170 from the rearward advanced retaining position, the locking surface 175 progressively shifts relative to the locking balls 160, until the locking surface 175 no longer covers the locking balls 160, the radial movement of the centrifugal locking balls 160 at the central axis A100 being then no longer prevented by the locking ring 170. In other words, the locking ring 170 allows the locking balls 160 to move into the release position, the locking ring 170 being in a retracted unlocking position, as shown in FIGS. 3 and 5.

In the unlocking position, the groove 176 is then radially aligned with the locking balls 160 and configured to partially accommodate the locking balls 160 in the release position.

The fluidic coupling element 100 further comprises a spacer ring 178, which is accommodated in the internal volume V100 and which is interposed longitudinally between the distal part 140 and the proximal part 110. The spacer ring 178 is herein engaged in the distal part 140 and in the proximal part 110 with a reduced radial play.

The spacer ring 178 has an overall tubular shape with an internal side 178A of overall cylindrical shape oriented toward the main axis A100, an external side 178B oriented opposite from the internal side 178A, a rear axial end surface 178C, which is oriented rearward and connects the internal side 178A to the external side 178B.

The spacer ring 178 comprises, at a front end, a bulge 178D which forms an annular protrusion with respect to the internal side 178A and forms a front end axial surface 178E of the spacer 178. The front end axial surface 178E has herein the shape of a ring, oriented toward the front.

The spacer ring 178 comprises a protuberance 179 which protrudes from the external side 178B. The protuberance 179 forms a third external radial surface 179A and an axial abutment surface 179B oriented forwards. The third external radial surface 179A, which is herein a substantially cylindrical surface of circular cross-section, is delimited at the front by the axial abutment surface 179B. The protuberance 179 is shifted rearwards with respect to the distal part 140 in the assembled configuration of the distal and proximal parts, so that the third external radial surface 179A is located radially opposite the second internal radial surface 122 of the proximal part 110, and that the axial abutment surface 179 B is situated opposite the rear axial end surface 147 B of the distal part 140. Thereby, the axial abutment surface 179 B is apt to abut frontally against the axial rear end surface 147B of the distal part 140 in the assembled configuration of the distal 140 and proximal 110 parts.

The fluidic coupling element 100 further comprises a piston 180, which is accommodated in the internal conduit V100, a valve 182, which has a tubular shape and which is movable around the piston 180, and a valve spring 184.

The piston 180 is a one-piece and comprises a distal head 181A, an intermediate rod 181B and a proximal collar flange 181C. The piston 180 extends along the central axis A100 into internal conduit V100. The proximal collar 181C protrudes radially from the intermediate rod 181B and is pierced by a plurality of passages for the fluid in the internal conduit V100. In the assembled configuration of the fluidic coupling element 100, the proximal collar 181C is housed radially opposite the third internal radial surface 123 of the proximal part 110.

The valve 182 has an overall shape of a ring and is arranged around the distal head 181A and the intermediate rod 181B. The valve 182 comprises an internal radial surface 183A which is oriented toward the central axis A100, an external radial surface 183B which is oriented opposite from the internal radial surface 183A, and a front end surface 183C which connects the internal radial surface 183A to the external radial surface 183B and which is oriented forwards.

The valve 182 is movable about the piston 180, between a front closing position, wherein the valve 182 closes the internal conduit V100, and a rear opening position wherein the valve 182 permits fluid to pass through the internal conduit V100. More precisely, in the front closing position, the external radial surface 183B of the valve 182 cooperates in a leak-tight manner with the body 102, via a second seal 192, whereas the internal radial surface 183A of the valve 182 cooperates in a leak-tight manner with the distal head 181A of the piston via a third seal 193, which is housed in the distal head 181 of the piston 180 and which is interposed radially between the distal head 181A and the valve 182. In the front closing position, the valve 182 is radially opposite the distal head 181.

The valve 182 has a minimum internal radial dimension R182 which is greater than a maximum external radial dimension R181A of the distal head 181A, in such a way that the distal head 181A does not interfere with the translational movements of the valve 182 with respect to the piston 180 along the central axis A100.

The valve 182 is shown in the front closing position in FIGS. 1 and 2, and in the rear opening position in FIGS. 3, 4 and 5.

In the first embodiment, the second seal 192 is accommodated in a second sealing housing 192A, which is delimited, on the one hand, by the front axial end surface 178E of the spacer 178 and, on the other hand, by a counterbore formed on the internal side of the distal part 140, the counterbore forming a bottom surface 192B and a distal wall 192C of the second sealing housing 192A. The front axial end surface 178E thereby forms a proximal wall of the groove 192A. The second sealing housing 192A accommodating the second seal 192 is thereby an "open groove".

In the rear opening position, the valve 182 is longitudinally shifted from the distal head 181A and from the second and third seals 192 and 193, allowing fluid to pass through the internal conduit V100. The second and third seals 192/193 are arranged substantially at the same level along the central axis A100, in other words are aligned along a plane orthogonal to the central axis A100.

The valve spring 184 is interposed between the valve 182 and the proximal collar flange 181C of the piston 180, the valve spring 184 tending, by elastic return, to push the valve 182 toward the front closing position. In the uncoupled configuration of the fluidic coupling element 100, as illustrated in FIG. 1 a), the valve 182 is pushed back into the closing position by the valve spring 184. In the closing position, the valve 182 is in front abutment against the spacer ring 178. More precisely, the valve 182 abuts against the bulge 178D of the spacer ring 178 and pushes the spacer ring 178 back into front abutment against the distal part 140. In other words, the valve 182 is not in front abutment against the piston 180 but is indirectly in front abutment against the distal part 140.

Preferably, when the valve 182 is in the closing position, a front end surface of the piston 180 and a front end surface of the valve 182 are aligned.

In the assembled configuration of the distal part 140 and the proximal part 110 of the body 102, the proximal collar 181C of the piston 180 is interposed longitudinally between the proximal part 110 and the distal part 140 insofar as the proximal collar 181C faces longitudinally rearwards at the front axial stop 125 of the proximal part 110 and forwards at the surface axial rear end 178C of spacer ring 178, the spacer ring 178 as such facing longitudinally forwards the axial rear end surface 147B of the distal part 140, which limits a longitudinal position of the proximal collar flange 181C and of the spacer ring 178 in the body 102. A longitudinal position of the piston 180 in the body 102 is thereby limited.

The axial abutment surface 128 formed on the proximal part 110 for the locking ring 170 is arrange at the front of the proximal axial wall 152B of the external groove 150. Whatever the relative longitudinal position of the distal part 140 and of the proximal part 110 of the body 102 due to the limited longitudinal plays between the proximal collar flange 181C, the spacer ring 178, the proximal part 110 and the distal part 140, the spacer ring 178 is apt to cooperate only with axial surfaces of the distal part 140 and of the proximal part 110. Advantageously, no surface of the proximal part 110 and no surface of the locking ring 170 faces longitudinally, along the rearward direction, a surface of the distal part 140, which enables the locking ring 170 and the proximal part 110 to be assembled around the distal part 140 from the rear of the distal part 140, as described hereinafter with reference to FIG. 6.

For the assembly of the body 102, a front subassembly 194A which includes the distal part 140, and a rear subassembly 194B which includes the proximal part 110, are formed. The assembly of the front subassembly 194A to the rear subassembly 194B forms the fluidic coupling element 100.

The front subassembly 194A thereby includes, in addition to the distal part 140, the locking ring 170, the locking ball 160 and the actuating ball 162, the locking spring 171, and the split ring 190. The locking ball 160 and the actuating ball 162 are positioned in the respective housings 158 and 159 thereof at the first external radial surface 146, then the locking ring 170 and the locking spring are positioned around the distal part 140, from the rear of the distal part 140.

The split ring 190 is housed in the external groove 150 of the distal part 140, the split ring 190 being held compressed radially in the external groove by means of a tooling 195, so that the split ring 190 thereby compressed is entirely contained in the external groove 150. The tooling 195 is not part of the fluidic coupling R1 but is used to explain the context of the use of said coupling, more particularly the assembly.

In the example illustrated, the tooling 195 comprises a plurality of plates, which are simply cut out. The tooling 195 thereby comprises a first tool formed of two half-shells 196A and 196B, each of which has a semicircular cut-out with an internal radius substantially equal to an external radius of the compressed split ring 190, preferably equal to an external radius of the second external radial surface 148. In a variant (not shown), the first tool comprises a plate with a U-shaped cut-out.

The two half-shells 196A and 196B are configured to move radially away from/come close to the central axis A100 and cooperate with each other to compress the split ring 190 in the external groove 150, so that the split ring 190 is completely contained in the external groove 150. To this end, the maximum radial dimension of the split ring 190 in the compressed configuration is smaller than or equal to a diameter of the second external radial surface 148 of the distal part 140. Compressing the split ring 190 in the external groove 150 also has the advantage of centering the split ring 190 with respect to the distal part 140.

Advantageously, in order to ensure a good distribution of the forces on the split ring 190, the two half-shells 196A/196B radially cover the split ring 190 over at least one third of the length L190 thereof. It is thus necessary that the rear axial end surface 177C of the locking ring 170, when the latter is in the advanced retaining position, be distant forwards with respect to the distal wall 152C of the external groove 150, in order to make possible the fitting of the tooling 195. In other words, the distal wall 152C of the external groove 150 is shifted rearwards with respect to the rear end surface 177C of the locking ring 170 when the locking ring 170 is in the advanced retaining position. Preferably, a distance between the rear axial end surface 177C of the locking ring 170, when the latter is in the advanced retaining position, and the distal wall 152C of the external groove 150 is at least equal to the length L190 of the split ring 190.

The tooling 195 further comprises a second plate 197 which forms an axial stop for the locking spring 171.

The second seal 192 is inserted into the distal part 140, through the rear of the distal part 140. The spacer ring 178 is partially inserted into the distal part 140 until same abuts frontally against the rear axial end surface 147B of the distal part 140. The front axial end surface 178E of the spacer ring 178 then forms the proximal wall of the sealing housing 192A accommodating the second seal 192, whereas the bottom surface 192B and the distal wall 192C of the sealing housing 192A are formed on the distal part 140. The valve 182 is then engaged by the rear of the spacer ring 178 until same abuts against the spacer ring 178.

The valve spring 184 is engaged in the front subassembly 194A, precisely in the spacer ring 178 in contact with the valve 182.

The rear subassembly 194 B is also formed, which includes the proximal part 110, the first seal 191 fitted in the second internal groove 132 of the proximal part 110, the piston 180 equipped with the third seal 193, which are inserted through the front side of the proximal part 110. The one-piece structure of the piston 180 facilitates the fitting of the slide valve 182 and of the piston 180 into the subassemblies 194A and 194B.

Figure 6:
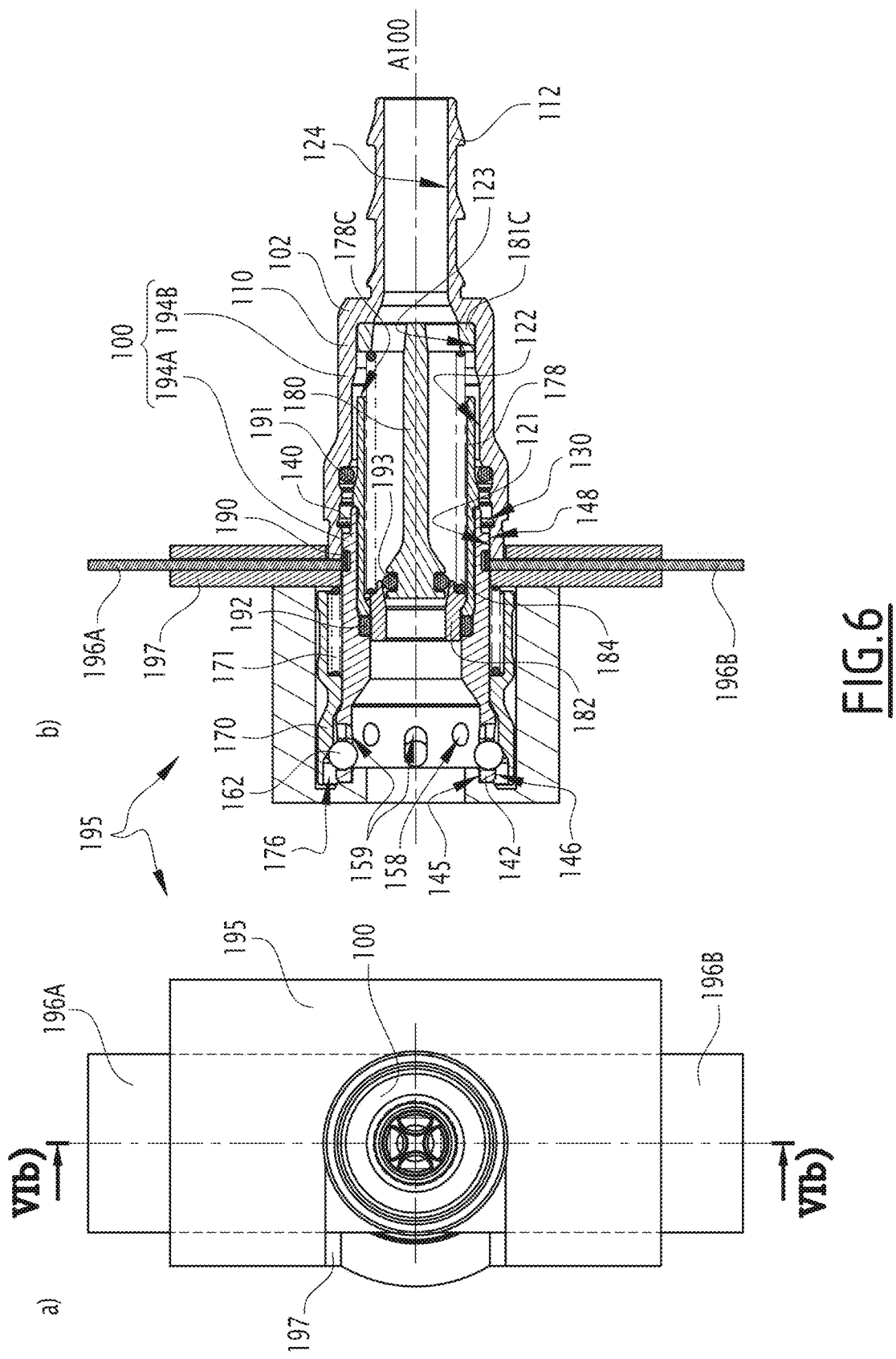
FIG. 6 shows, on two inserts a) and b), a side view and a longitudinal section of the fluidic coupling element shown in FIG. 1 and of the tools for assembling the fluidic coupling element, which is shown in an intermediate configuration during the assembly of the coupling element.

The front subassembly 194A and the rear subassembly 194B are brought close to each other parallel to the central axis A100. The valve spring 184 abuts against the proximal collar flange 181C of the piston 180. The distal part of the proximal part 110 engages around the spacer ring 178 and then around the proximal part of the distal part 140. The first internal radial surface 121 engages around the second external radial surface 148 and then around the external groove 150, which accommodates the split ring 190 compressed by the tooling 195. A longitudinal dimension L121 of the first internal radial surface 121 in front of the first internal groove 130, greater than a length L150 of the external groove 150, allows the proximal part 110 to remain centered on the distal part 140 whereas the first internal radial surface 121 covers the external groove 150. The front axial end surface 114 of the proximal part 110 then abuts longitudinally against the tool 195, as illustrated in FIG. 6.

The tooling 195 is then removed. By elastic return, the split ring 190 abuts radially against the first internal surface 121, in front of the first internal groove 130. The first seal 191 is then compressed into the housing thereof by placing the terminal external radial surface 154 radially opposite the second internal groove 132. At the same time, the second internal radial surface 122 of the distal part 140 cooperates with the third external radial surface 179A of the spacer ring 178 with reduced radial play.

While the movement toward each other of the front subassembly 194A and the rear subassembly 194B continues, the proximal part 110 progresses toward the front of the distal part 140 until the proximal part 110 abuts against the piston 180, as such in front abutment against the spacer ring 178, as such in front abutment against the rear end surface 147B of the distal part 140. In the abutment position, the entire length of the ring/obstacle 190 radially faces the first internal groove 130 and the split ring 190 is thus free to deform elastically. As the maximum diameter D190 of the split ring 190 in the free state is strictly smaller than the diameter of the cylindrical bottom surface 131A, the ring 190 deforms elastically until same abuts radially outwards against the cylindrical bottom surface 131A of the first internal groove 130. The obstacle 190 thus has, in the free state, a maximum external radial dimension, which corresponds to the maximum diameter D190, greater than in the assembled configuration of the body 102.

When all assembly action ceases on the proximal part 110 and the distal part 140, the valve spring 184 tends to push the piston 180 and the proximal part 110 rearward with respect to the distal part 140 and to the spacer ring 178, the valve 182 being in front abutment against the spacer ring 178. Such movement corresponds to a separation movement of the distal 140 and proximal 110 parts, the split ring 190 being interposed between the distal axial wall 131D of the first internal groove 130 and the proximal axial wall 152B of the external groove 150, which blocks the separation movement.

Figure 7:
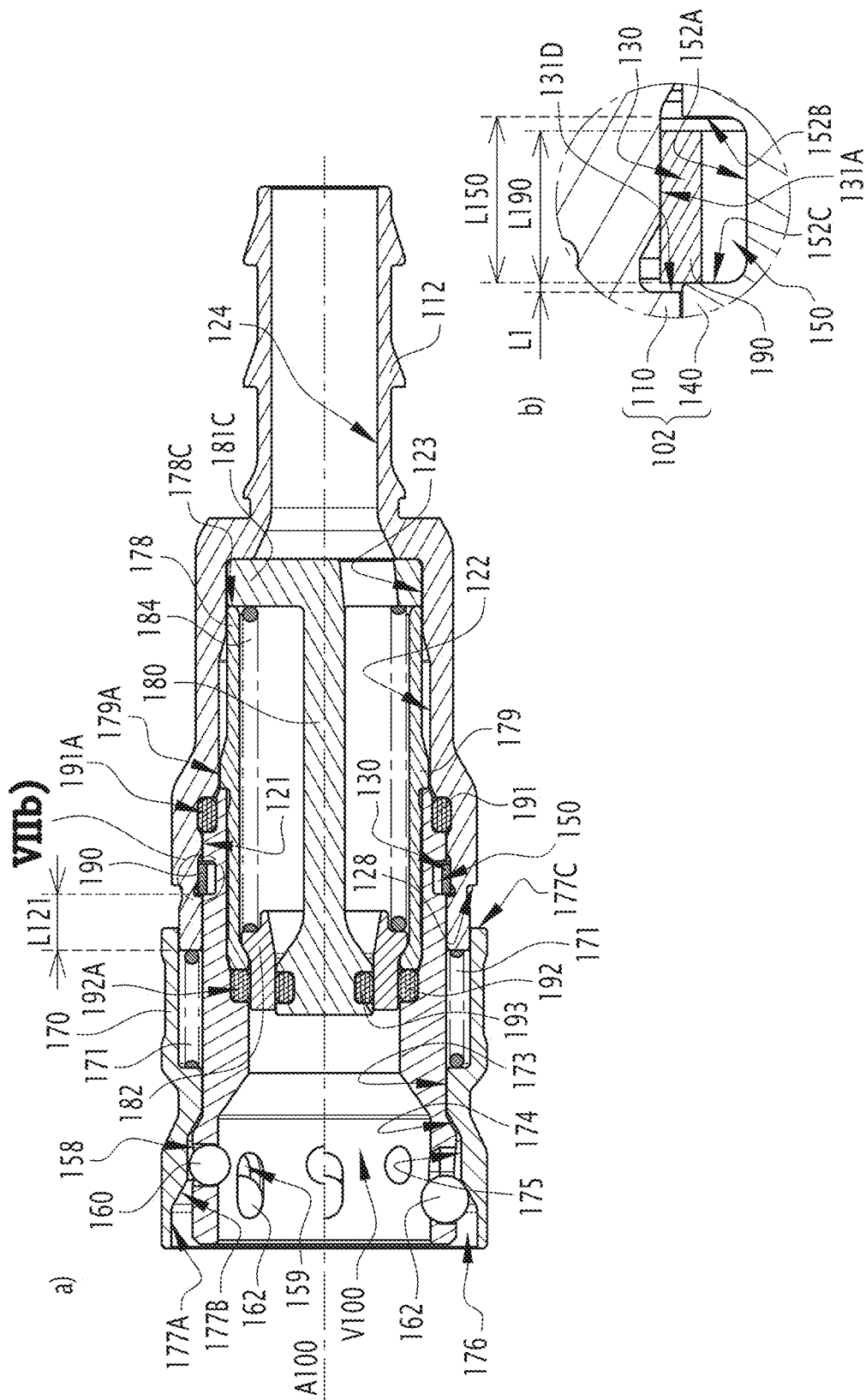
FIG. 7 shows, respectively, on two inserts a) and b), a broken-out section and a detail of the fluidic coupling element shown in FIG. 1, the fluidic coupling element being in an abutting configuration.

The configuration of the split ring 190 and the geometry of the first internal groove 130 make the assembly between the distal part 140 and the proximal part 110 impossible to disassemble. With reference to FIG. 7, the female element 100 is shown in an abutting configuration, wherein the proximal part 110 is brought closer to the distal part 140 against the valve spring 184, until the proximal part 110 indirectly abuts against the distal part 140. The assembly of the distal part 140 and of the proximal part 110 is done with an overtravel L1 for bringing the distal part 140 and the proximal part 110 closer together, the overtravel L1 corresponding to dispersions of a longitudinal distance between the distal axial wall 131B of the external groove 150 and the rear axial end surface 178C of the spacer ring 178 when the spacer ring 178 is in front abutment against the distal part 140, of the longitudinal dimension of the proximal collar flange 181C of the piston 180 and of the longitudinal distance between the distal wall 131D of the first internal groove 130 and the front axial stop 125 formed on the proximal part 110 for the piston 180. A length L130 between the rear end of the cylindrical bottom surface 131A of the first internal groove 130 and the distal wall 131D of the first internal groove 130 is greater than the sum of the length L190 of the ring 190 and the approaching overtravel L1.

In the assembled configuration of the body 102, the second external radial surface 148 faces radially the first internal radial surface 121.

The mounting of the locking ring 170 from the rear of the distal part 140 and the mounting of the proximal part 110 around the distal part 140 leads to maximum radial compactness and avoid additional parts.

A coupling sequence of the fluidic coupling R1 is now described with reference to FIGS. 1 to 4.

While the fluidic coupling R1 is initially in the uncoupled configuration, as shown in FIG. 1a, the main axis A10 of the mating end-piece 10 is aligned with the central axis A100 of the fluidic coupling element 100, the mating end-piece 10 then being brought closer to the fluidic coupling element 100 along the central axis A100 and being inserted through the front opening 104 into the internal volume V100.

With reference to FIG. 2, the piston 180 comes into contact with the check valve 16 and the male body 12 of the mating end-piece 10 comes into contact with the valve 182, the check valve 16 and the valve 182 each being pushed back toward the respective opening position thereof when the coupling movement continues. The end external radial surface 22 of the male body 12 comes into contact with the second seal 192, which ensures the leak-tightness of the male V10/female V100 internal conduits with respect to the outside of the male body 12 and of the body 102 of the fluidic coupling element 100. The frustoconical front surface 25A of the actuating collar flange 24 comes into contact with the actuating balls 162, which are thereby pushed back into the elongated housings 159, whereas the frustoconical front surface 25A remains at a longitudinal distance from the locking balls 160. The movement of the actuating balls 162 is accompanied by a backward movement of the locking ring 170 since the actuating balls 162 are in contact with the front surface 177B. The locking balls 160 in turn come into contact with the frustoconical front surface 25A and move radially outward in the groove 176 of the locking ring 170, now radially facing the locking balls 160 since the locking ring 170 has been displaced rearwards by the actuating balls 162.

The check valve 16 and the valve 182 continue the movement thereof toward the retracted opening position thereof, whereas the actuating balls 162 then reach a rear abutment against the proximal wall of the elongated housing 159 thereof, then same are moved radially outwards in the groove 176 so as to leave the radial passage for the actuating collar flange 24. The actuating balls 162 have pushed the locking ring 170 back at least as far as the retracted unlocking position. The quick-coupling R1 is then in the configuration shown in FIG. 3. In such configuration, the locking balls 160 can reach the release position thereof in the groove 176 of the locking ring 170.

As the male 12 and female 102 bodies continue to move toward each other, the locking groove 26 comes radially opposite the locking balls 160 which can move radially inwards into the locking position, under the elastic force of the locking spring 171 which pushes the locking ring 170 back, which returns to the advanced retaining position. The quick-coupling R1 is then in the coupled configuration, as illustrated in FIG. 4. In the coupled configuration, the locking balls 160 are covered radially by the locking surface 175 and held in the locking position, wherein the locking balls 160 cooperate with the frustoconical external portion 25C of the actuating collar flange 24, so as to retain the mating end-piece 10 in the distal part 140 of the female body 102. The locking ring 170 is in front abutment against the actuating balls 162, which have been brought under the elastic force of the locking ring 170 into front abutment against the distal walls of the elongated housings 159.

The internal channel V10 of the mating end-piece 10 and the internal conduit V100 of the fluidic coupling element 100 communicate fluidically, and the fluid can flow from one to the other. Only the portion of the internal conduit V100 arranged on the rear side of the second seal 192 can be in contact with the fluid passing through the coupling element 100. The locking of the coupling element 100 with the mating end-piece 10 is automatic, insofar as the only maneuver of bringing the coupling element 100 and the mating end-piece 10 closer together leads to the locking. The fluidic coupling R1 is called "quick" insofar as no tool is needed for locking and unlocking the fluidic coupling element 100 and the mating end-piece 10.

A sequence for uncoupling the fluidic coupling R1 is described with reference to FIGS. 4 and 5.

The fluidic coupling R1 is initially in a coupled configuration. For uncoupling, the locking ring 170 is moved rearwards by an operator at least as far as the retracted unlocking position thereof, until same abuts at the rear against the axial abutment surface 128 of the body 102 of the fluidic coupling element 100. The groove 176 then radially faces the locking ball 160 and the actuating ball 162, the locking ball 160 and the actuating ball 162 then being free to clear the radial passage for the actuating collar flange 24, and hence for the mating end-piece 10, which can be removed from the fluidic coupling element 100 in a movement of separation inverse to the approaching movement. The check valve 16 and the valve 182 each go back to the front closing position thereof, each being pushed back by the corresponding spring 44 or 184.

Once the mating end-piece 10 is disengaged from the internal conduit V100, when the locking ring 170 is released, the fluidic coupling element 100 returns to the uncoupled configuration thereof, with the locking ring 170 in the advanced retaining position, in front abutment against the actuating balls 162, as such in front abutment against the distal wall of the elongated housings 159, the locking balls 160 being pushed back into the internal locking position.

The quick-coupling R1 provides several advantages.

Due to the assembly by means of an elastically deformable segment/obstacle, herein the split ring 190, the body 102 is radially compact, more particularly more compact than if the proximal and distal parts were screwed to each other. The split ring 190, housed partially in the external groove 150 of the distal part 140 and partially in the first internal groove 130 of the proximal part 110, is protected from external shocks, the fluidic coupling element 100 thereby lasting longer.

In assembled configuration of the body 102, the proximal collar flange 181C of the piston 180 limits the approach of the distal part 140 and of the proximal part 110 to a configuration where the split ring 190 is in external contact only with the cylindrical bottom surface 131A of the internal groove 130. Whatever the relative longitudinal position of the distal part 140 and proximal part 110 tolerated by the assembly by means of the obstacle 190, the split ring 190 cooperating forwards only with the distal axial wall 131D, rearwards only with the proximal axial wall 152B and outwards only with the cylindrical bottom surface 131A of the first internal groove 130, the split ring 190 cannot be deformed inwards, and the assembly of the proximal part 110 to the distal part 140 cannot be disassembled, i.e. is secured. The assembly is done in a single operation, which is particularly quick and convenient. In comparison, if the proximal and distal parts were screwed to each other, the assembly would also have to be locked to be secured, e.g. by bonding.

Since the split ring 190 is simply deformed to make possible the assembly of the body 102, the tooling 195 is simple and economical to produce, the tooling 195 being easy to fit on the first subassembly 194A and then easy to remove, which limits the machining required on the proximal 110 and distal 140 parts for the assembly, which contributes to compactness and to the control of the manufacturing costs. The split geometry of the obstacle 190 enhances deformation of the obstacle 190. The deformation of the obstacle 190 by reducing the external diameter of the obstacle 190 between the free state and the assembled state in the proximal 110 and distal 140 parts leads to a radially compact assembly. Since the external diameter of the obstacle 190 remains smaller than the external diameter of the distal part at the first and second housings, the body 102 is also radially compact.

Since the split ring 190 can be entirely contained in the external groove 150 for the mounting, the proximal 110 and distal 140 parts can be mounted with reduced radial play, for greater radial compactness. Advantageously, during assembly, the cooperation of the first internal radial surface 121 and of the second external radial surface 148, before the proximal part 110 covers the split ring 190, serves to center and guide the proximal part 110 and the distal part 140, by preventing sticking and frictional forces of the split ring 190 on the proximal part 110.

The positioning of the first seal 191 rearwards from the obstacle 190 allows the fluidic coupling element 100 to be more compact axially.

The proximal part 110 and the distal part 140 may be of different materials, the materials having no requirement of compatibility—as would be the case for welded assemblies—.

The split ring assembly 190 housed in external peripheral grooves 150 and internal peripheral grooves 130 allows the proximal part 110 and the distal part 140 to be movable relative to each other about the central axis A100, which makes it possible e.g. to accommodate possible movements and/or deformations of the pipe C1.

The fitting of the first and second seals 191 and 192 in an open groove limits the risk of accumulation of machining chips in the grooves, which increases the service life of the seals accommodated therein.

The elongated housings 159 for the actuating balls 162 allow the locking balls 160 to not need to push back the locking ring 170 during coupling, which reduces the risk of blockage during the coupling of the fluidic coupling R1.

Alternative embodiments of the invention are illustrated in FIGS. 8 to 14. In the alternative embodiments of the invention, the elements analog to the elements of the other embodiments have the same references and work in the same way. The differences between each embodiment and the preceding embodiment or embodiments is described hereinafter.

Figure 8:
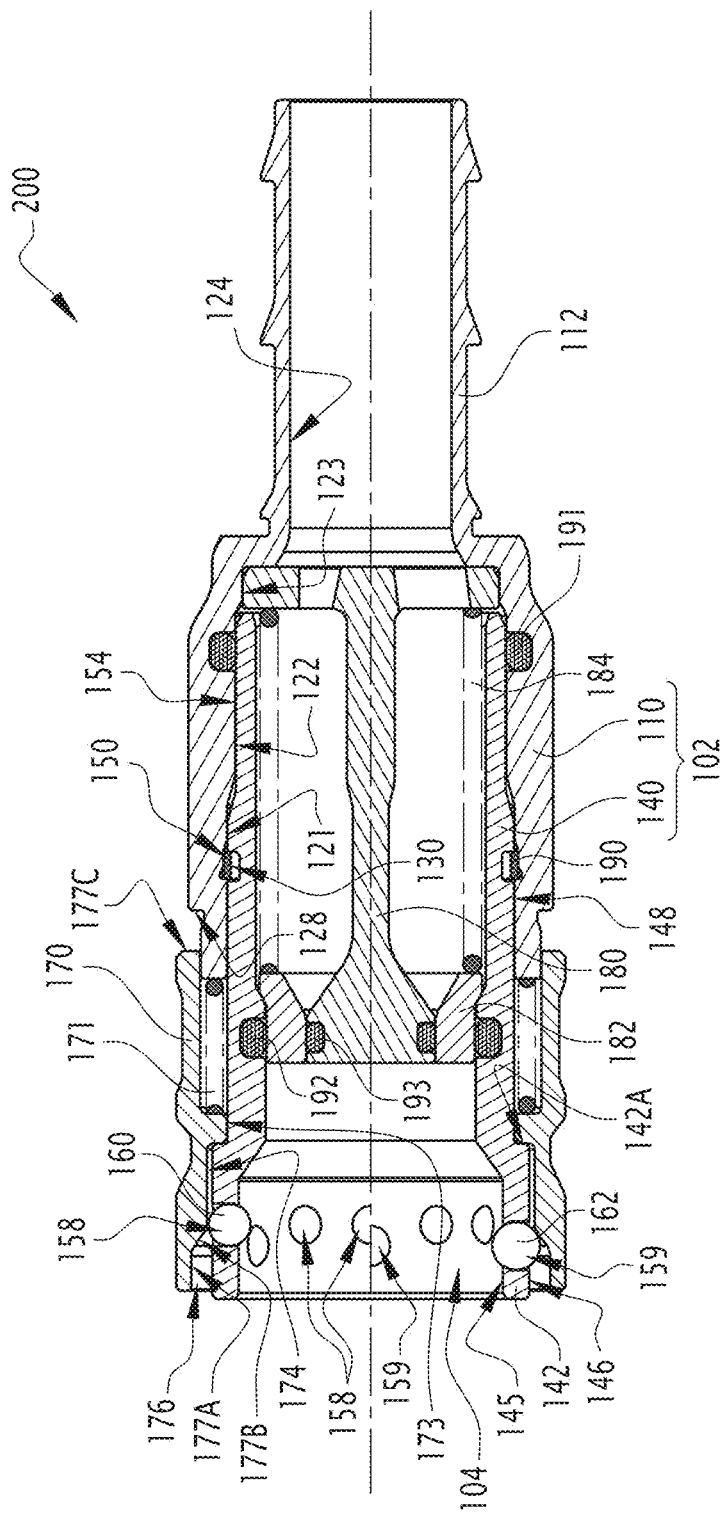
FIG. 8 is a broken-out section of a fluidic coupling element according to a second embodiment of the invention.
Figure 9:
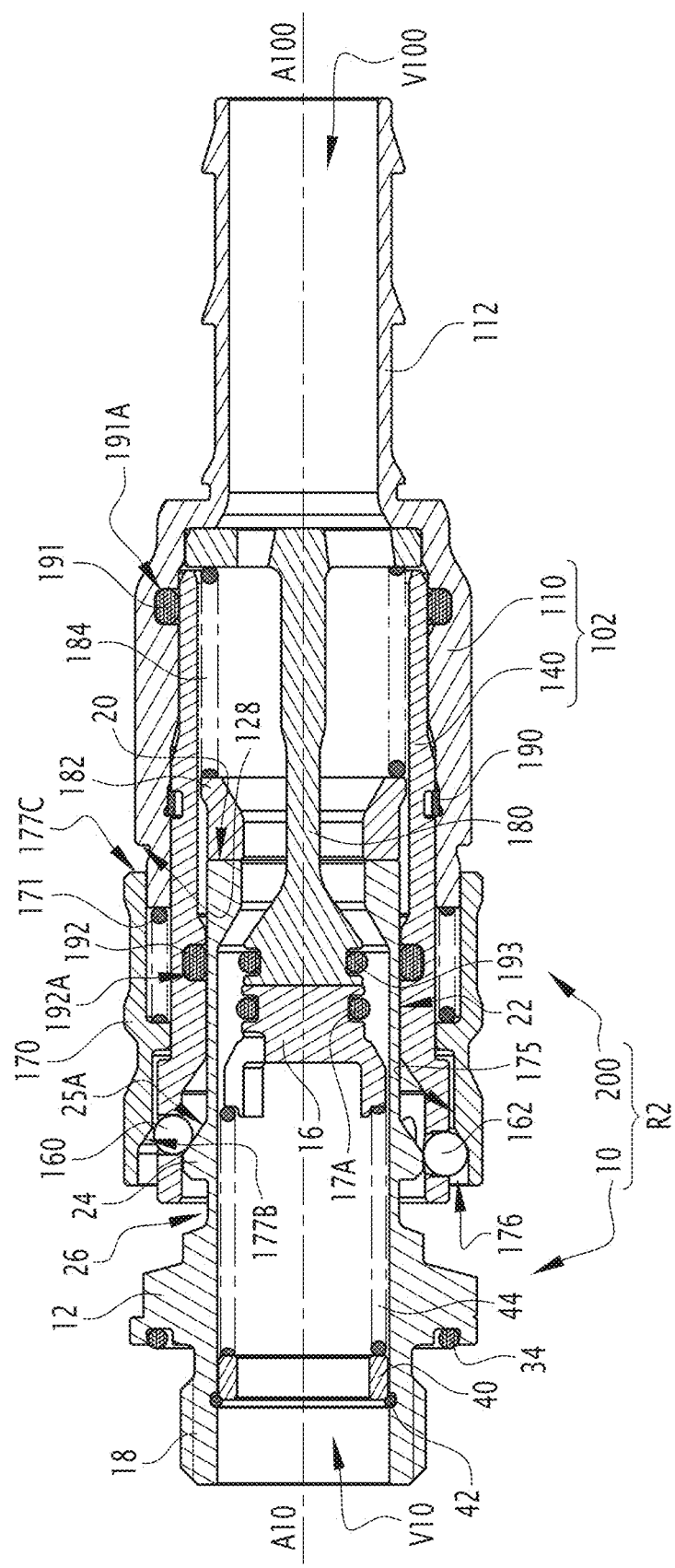
FIG. 9 is a broken-out section of a fluidic coupling according to a second embodiment of the invention, the fluidic coupling comprising the fluidic coupling element shown in FIG. 8 and being represented in an intermediate configuration during a coupling sequence.
Figure 10:
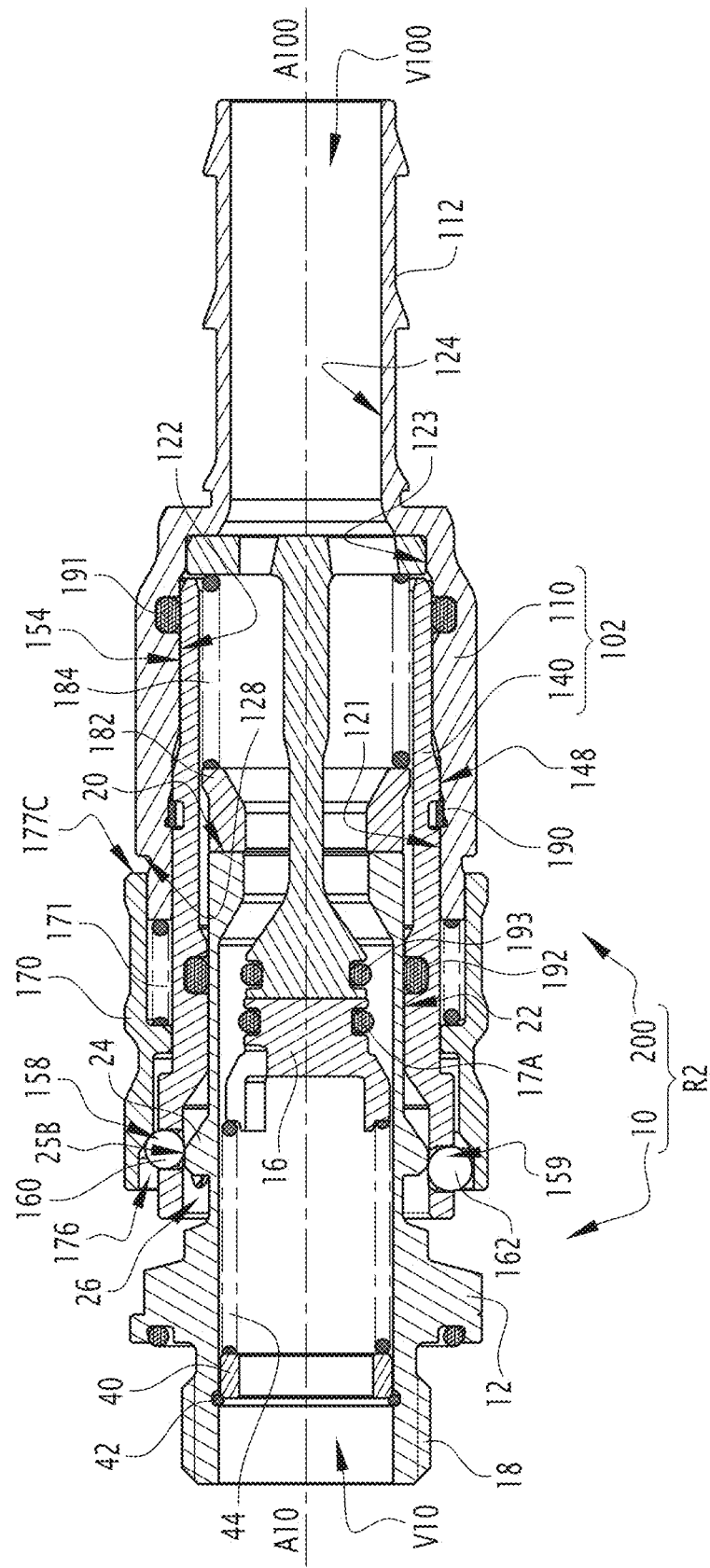
FIG. 10 is a broken-out section of the fluidic coupling shown in FIG. 9, shown in another intermediate configuration.
Figure 11:
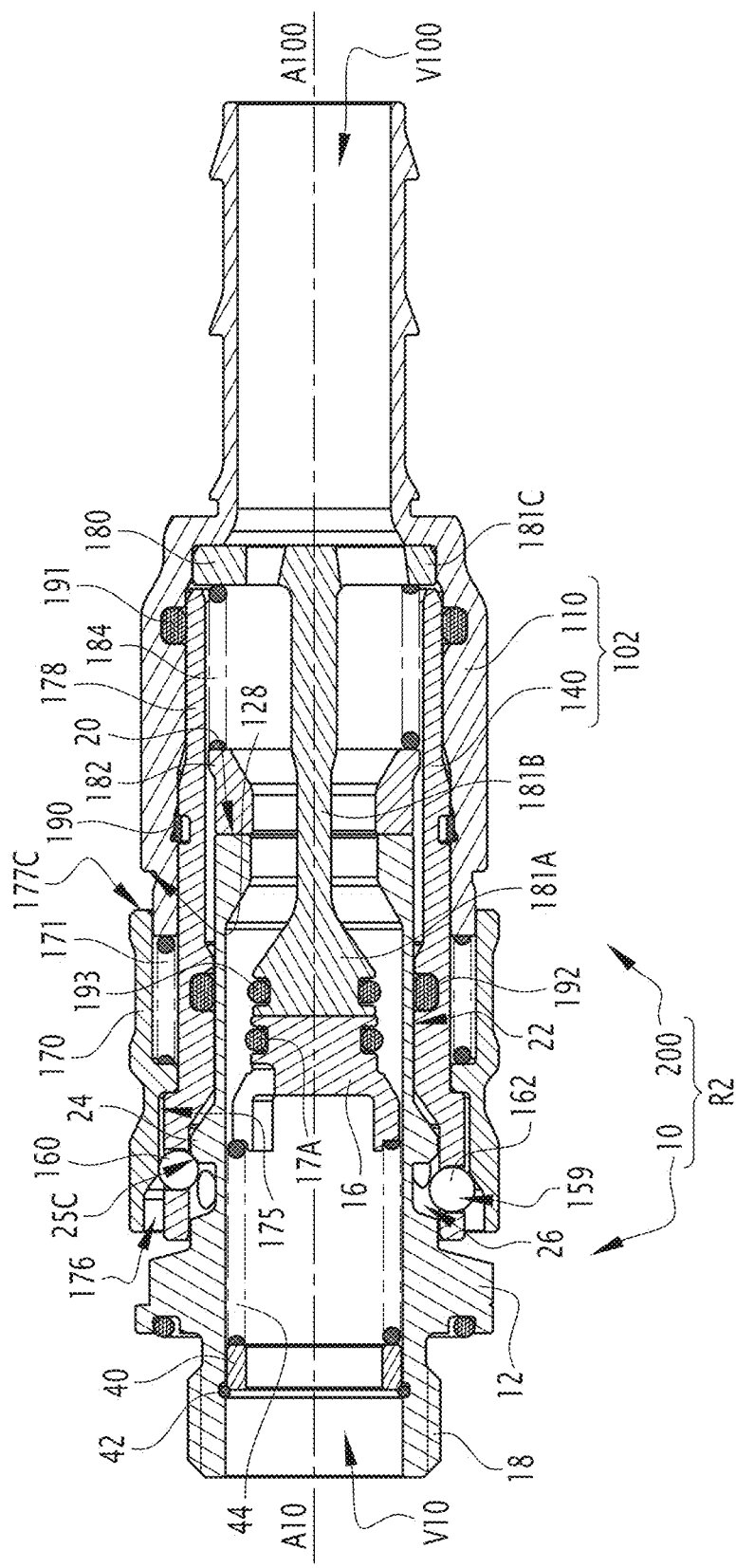
FIG. 11 is a broken-out section of the fluidic coupling shown in FIG. 9, shown in the coupled configuration.

A fluidic coupling R2, according to a second embodiment of the invention, is shown in FIGS. 8 to 11. The fluidic coupling R2 comprises a fluidic coupling element 200, which is shown isolated in FIG. 8, whereas the fluidic coupling element 200 and the mating end-piece 10 are shown in FIGS. 9 to 11 which illustrate a coupling sequence of the fluidic coupling element 200 to the mating end-piece 10. One of the main differences with the fluidic coupling element 100 of the first embodiment is that, in the second embodiment, the actuating balls 162 are accommodated in second housings 259 which are not elongated, but only radial. Moreover, the fluidic coupling element 200 of the second embodiment does not comprise a spacer ring 178.

In addition, the first and second seals 191 and 192 are accommodated in first and second sealing housings 191A and 192A, respectively, which are not "open grooves" but which are herein "closed grooves" directly provided in the distal part 140 and the proximal part 110, respectively. More precisely, the first sealing housing 191A is provided recessed in the second internal radial surface 122, facing the external end radial surface 154 of the distal part 140. In such embodiment, in the absence of a spacer ring, the external end radial surface 154 forms a third external radial surface of the distal part 140, the third external radial surface substantially mating the second internal radial surface 122 of the proximal part 110 and cooperating with the second internal radial surface 122 in the assembled configuration of the body 102 with reduced radial play.

As illustrated in FIG. 8, the valve 182 in the closing position is directly in front abutment against the distal part 140 of the body 102.

With reference to FIG. 9, during coupling, the actuating collar flange 24 pushes the actuating balls 162 radially, the actuating balls 162 coming into contact with the front surface 177B of the locking ring 170 and pushing the locking ring 170 longitudinally rearward, until the actuating collar flange 24 comes into contact with the locking balls 160 and is inserted under the actuating balls 162.

Starting from the configuration shown in FIG. 9, whereas the coupling movement continues, the actuating collar flange 24 pushes the locking balls 160 toward the release position thereof, in a radial outward movement, i.e. a centrifugal movement relative to the main axis A100. The radial movement brings the locking balls 160 into contact with the front surface 177B and drives the locking ring 170 rearwards toward the retracted unlocking position until the groove 176 allows the locking balls 160 to reach the release position thereof. The actuating collar flange 24 is then inserted under the locking balls 160, as illustrated in FIG. 10.

Whereas the coupling movement continues, the locking groove 26 comes at the level of the actuating balls 162, which are free to engage into the locking groove 26. Then, when the locking groove 26 is at the level of the locking balls 160, the latter engage into the locking groove 26. The locking ring 170 is then pushed back by the locking spring 171 toward the advanced retaining position of the locking ring, and the locking surface 175 covers the locking balls 160 in the locking position, locking the male body 12. The fluidic coupling R2 is then in the coupled configuration, as illustrated in FIG. 11. In the second embodiment, in the uncoupled configuration, when the locking ring 170 is in the advanced retaining position, the locking ring 170 is in front abutment directly against the body 102, precisely in front abutment against a shoulder 142A of the distal part 140— and not against the actuating balls 162, as is the case in the first embodiment—which limits the forward movement of the locking ring 170 relative to the body 102.

To uncouple the fluidic coupling R2, the locking ring 170 is pulled back by the operator against the locking spring 171 into the retracted unlocking position, the locking ball 160 and the actuating ball 162 being free to move apart in the groove 176, thereby freeing the passage for the male body 12 out of the female body 102.

Figure 12:
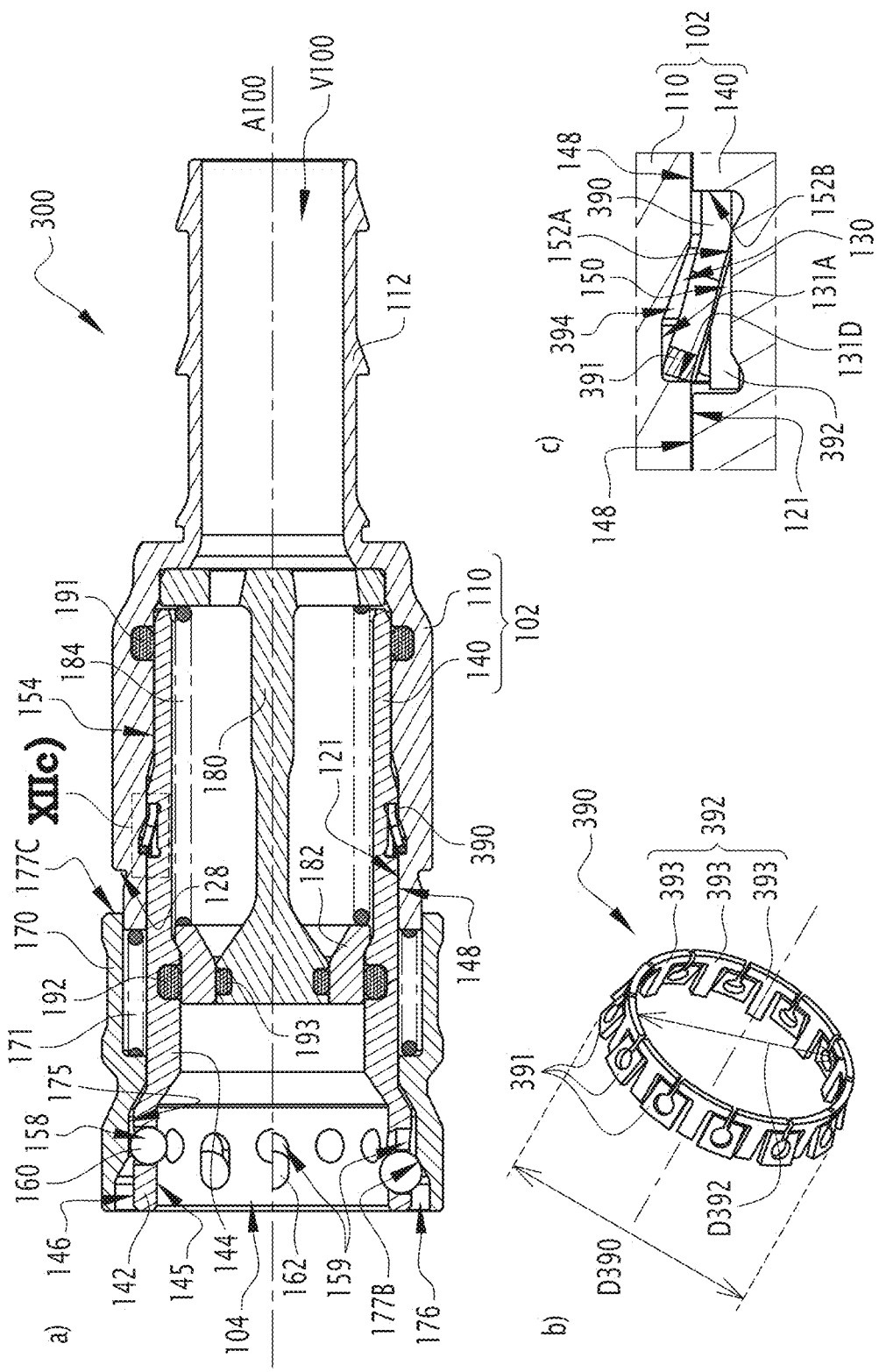
FIG. 12 shows, respectively, on three inserts a) to c), a broken cross-section of a fluidic coupling element belonging to a fluidic coupling according to a third embodiment of the invention, a part of this fluidic coupling element and a larger scale detail of the insert a)
Figure 13:
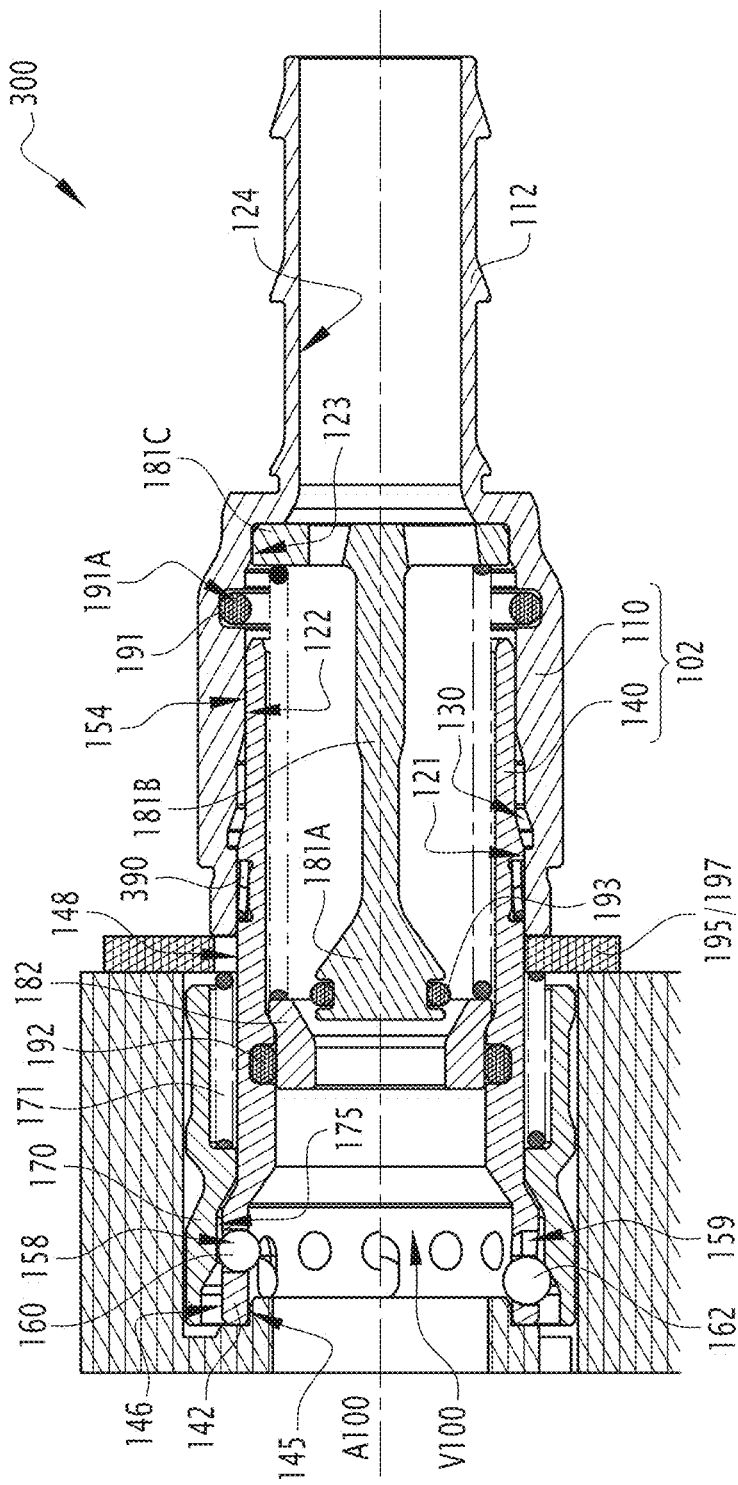
FIG. 13 is a broken-out section of the fluidic coupling element shown in FIG. 12 and tools for assembling the fluidic coupling element, the fluidic coupling element being shown in an intermediate configuration during the assembly of the fluidic coupling element.

A fluidic coupling element 300 belonging to a fluidic coupling according to a third embodiment of the invention is shown in FIGS. 12 and 13.

Whereas in the first and second embodiments, the elastic obstacle used to assemble the proximal part 110 and the distal part 140 is a split ring 190, in the third embodiment, the elastic obstacle used to assemble the proximal part 110 and the distal part 140 is a ring 390 which is made of metal and which comprises teeth which can be elastically deformed by bending.

With reference to the example shown in FIG. 12b), the ring 390 is e.g. manufactured by providing notches and bores in an initially cylindrical ring centered on a ring axis A390, so as to cut out teeth 391, each of which has a substantially parallelepipedal shape, and a cylindrical portion 392, which is herein formed by a succession of T-shaped elements 393. Each tooth 391 is attached to the cylindrical portion 392 by a front side, whereas a rear side of each tooth 391 is distant from the axis of the ring A390, so as to induce plastic deformation of the material at the junction between each tooth 391 and the cylindrical portion 392. As illustrated in FIG. 12c), the shapes of the first internal groove 130 and the first external groove 150 are modified accordingly to cooperate with the ring 390.

In the example illustrated, during the assembly of the distal part 140 and of the proximal part 110, the ring 390 is first of all positioned in the external groove 150, before inserting the subassembly comprising the distal part 140 and the ring 390 into the subassembly comprising the proximal part 110.

In FIG. 12b), the ring 390 is shown in a free configuration, wherein no external force-apart from gravity, if appropriate-applies to the ring 390. The teeth 391 are geometrically supported by a cone which is centered on the axis of the ring A390 and which diverges toward the rear of the ring 390. In the free configuration of the ring 390, the cylindrical portion 392, and by extension the ring 390, has an inside diameter D392, which is equal to a minimum value. The minimum value of the internal diameter D392 is substantially equal to a diameter of the bottom 152A of the external groove 150, as illustrated in FIG. 12c).

It will be understood that the second external radial surface 148 of the distal part 140 has an external diameter greater than the minimum value of the internal diameter D392 of the ring 390. Advantageously, the geometry of the ring 390, with regular notches distributed around the axis of the ring A390, makes it possible to widen the ring 390 by elastic deformation, in other words serves to increase the internal diameter D392, so as to allow the ring 390 to be mounted in the external groove 150 of the distal part 140 from the rear of the distal part 140 of the body 102. Once the ring 390 is aligned longitudinally with the external groove 150, the ring 390 returns, by elastic return, to the free configuration thereof, the cylindrical portion 392 being essentially accommodated in the external groove 150, whereas the teeth 391 protrudes radially outwards from the external groove 150. The ring axis A390 is then aligned with the central axis A100.

Then, when the proximal part 110 is mounted around the distal part 140, the first internal radial surface 121 of the proximal part 110 elastically deforms the teeth 391 by bending toward the central axis A100. The ring 390 is then entirely contained in the external groove 150. The teeth 391 redeploy, by elastic return, as soon as the internal groove 130 is radially opposite the entire length of the teeth 391 of the ring 390. The proximal 110 and distal 140 parts are then in an assembled configuration, as illustrated in FIG. 12c). Unlike the previous embodiments, in the third embodiment, no tooling is needed for holding the obstacle in the external groove 150 during the assembly of the body 102.

In the assembled configuration of the proximal 110 and distal 140 parts, when a separation movement is applied to the proximal 110 and distal 140 parts, the ring 390 cooperates both with the distal axial wall 131D of the internal groove 130 and with the proximal axial wall 152B of the external groove 150, to prevent the separation. More precisely, the teeth 391 cooperate with the distal axial wall 131D, whereas the cylindrical portion 392 cooperates with the proximal axial wall 152B, which blocks the separation movement of the proximal 110 and distal 140 parts.

The ring 390 is also in external contact with the bottom surface 131A.

When a movement of coming closer takes place within the limit given by the assembly with piston 180 between the proximal 110 and distal 140 parts, a dimensional play 394 is provided between the ring 390 and the internal groove 130, so that the ring 390 is no further deformed radially inwards. In the example illustrated, in the movement of coming closer, the ring 390 simply cooperates with the cylindrical bottom surface 131A of the internal groove 130. In a variant (not shown), in the assembled configuration of the proximal 110 and distal 140 parts, the teeth 391 do not touch the cylindrical bottom surface 131A of the first internal groove 130. In other words, a maximum external diameter D390 of the ring 390, taken at the end of the teeth 391, in the free state of the ring 390, is smaller than the diameter of the bottom surface 131A.

The coupling and uncoupling of the fluidic coupling element 300 with the mating end-piece 10 are identical to the preceding embodiments.

Figure 14:
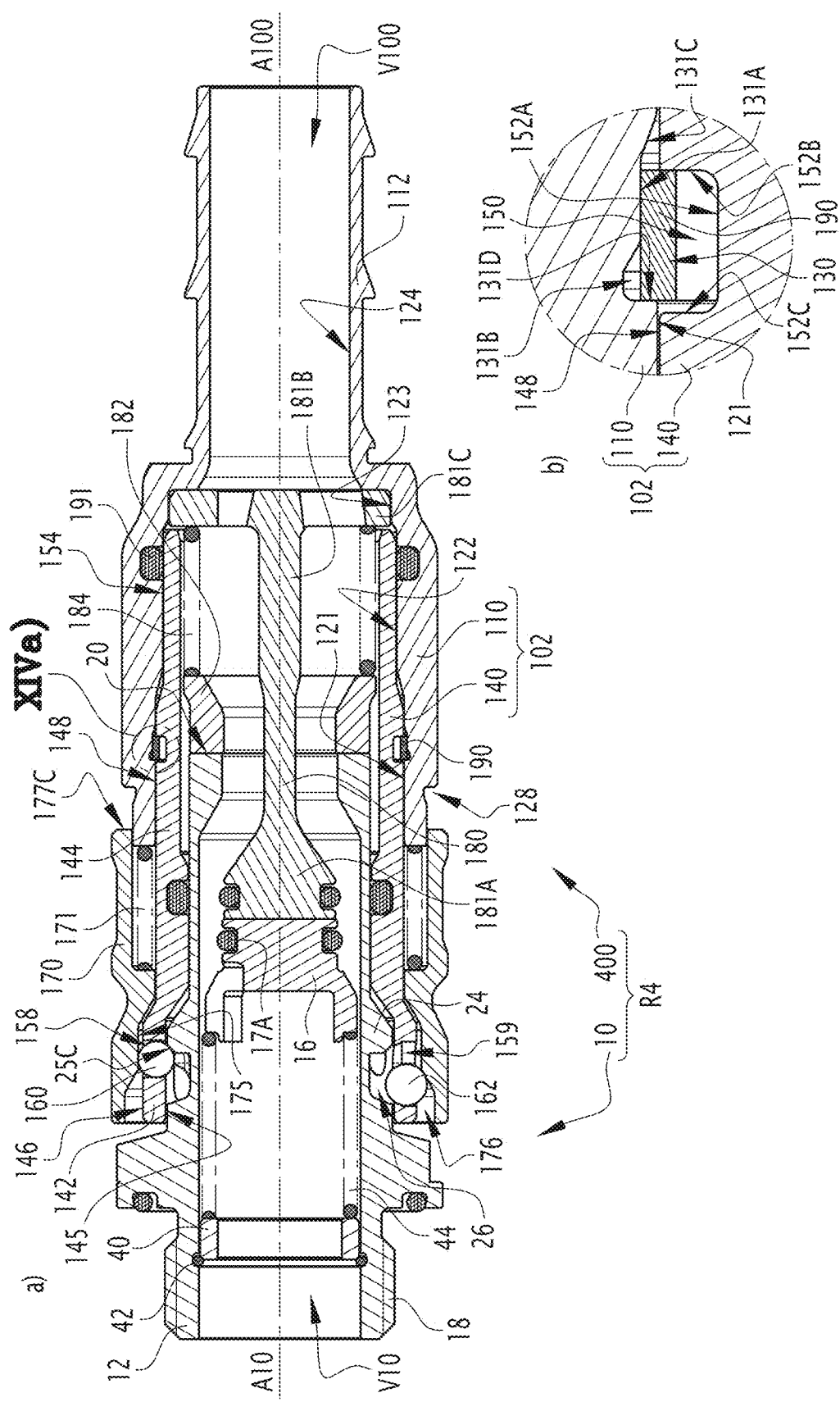
FIG. 14 shows on two inserts a) and b), respectively, a broken-out section of a fluidic coupling according to a fourth embodiment of the invention and a detail on a larger scale of the insert a), the fluidic coupling being shown in the coupled configuration.

A fluidic coupling R4, according to a fourth embodiment of the invention, is shown in FIG. 14, in a coupled configuration. The quick-coupling R4 comprises a fluidic coupling element 400 coupled to the mating end-piece 10.

The fluidic coupling element 400 of the fourth embodiment resembles the fluidic coupling element 100 of the first embodiment in that the actuating balls 162 are housed in elongated housings 159, but differs from the fluidic coupling element 100 of the first embodiment in that the fluidic coupling element 400 does not comprise a spacer ring 178, thereby resembling the fluidic coupling element 200 of the second embodiment. Thereby, in the fourth embodiment, the first and second sealing housings 191A and 192A accommodating the first and second seals 191 and 192 are "closed grooves", as in the second embodiment, whereas the valve 182 in the closing position is in front abutment directly against the distal part 140. The proximal collar flange 181C of the piston 180 is interposed longitudinally between the distal part 140 and the proximal part 110, insofar as the proximal collar flange 181C faces rearwards a surface of the proximal part 110 and, forwards, a surface of the distal part 140.

In the first, second, third and fourth embodiments, the proximal part 110 is arranged exclusively around the distal part 140. In other words, no surface of the proximal part 110 is arranged inside the distal part 140.

The simplicity and the compactness of the assembly of the proximal 110 and distal 140 parts of the body 102 by means of the deformable obstacle 190 or 390 can advantageously be implemented in a fluidic coupling element 100 the locking of which with the mating end-piece 10 during coupling is not automatic, especially in a coupling which does not comprise actuating balls. In such case, it is necessary for the operator to move the locking ring 170 from the advanced retaining position to the retracted unlocking position in order to couple the fluidic coupling element 100 and the mating end-piece 10. The embodiments and variants mentioned hereinabove can be combined with each other to generate new embodiments of the invention.

The fluidic coupling member (100) includes a body (102) defining an internal conduit (V100) configured to accommodate a mating end-piece (10). The body comprises a proximal part (110), which is in one-piece and delimits a proximal part of the internal conduit (V100), and a distal part (140) which is in one-piece, which defines a proximal part of the internal conduit (V100) and is fitted into the proximal part in an assembled configuration of the body. The proximal part comprises an internal groove (130) whereas the distal part comprises an external groove (150) that radially faces the internal groove at least partially when the body is in the assembled configuration. The fluidic coupling element further comprises an obstacle (190) which is elastically deformable and which, in the assembled configuration of the body, is partially accommodated in the external groove (150) and in the internal groove (130) so as to prevent the separation of the distal and proximal parts.

The invention claimed is:
1. A fluidic coupling element configured to be coupled to a mating end-piece, the fluidic coupling element comprising:
   a body defining an internal conduit, the internal conduit extending along a central axis and configured to accommodate the mating end-piece through a front mouth of the body,
   at least one locking ball, each locking ball being accommodated, respectively, in a respective first housing in the body and being radially movable between:
      a locking position, wherein the or each locking ball protrudes into the internal conduit and is apt to retain the mating end-piece in the body, and
      a release position, wherein the or each locking ball does not prevent the removal of the mating end-piece from the body,
   a locking ring, which is mounted around the body and which comprises a locking surface, oriented toward the central axis,
   the locking ring being longitudinally movable relative to the body between:
      an advanced retaining position, wherein the locking surface holds each locking ball in the locking position, and
      a retracted unlocking position, wherein each locking ball is free to move toward the release position,
   a locking spring, which pushes the locking ring toward the advanced retaining position, wherein the body comprises:
a proximal part delimiting a proximal part of the internal conduit and a rear ending intended for being coupled to a conduit, and
a distal part, which is in one-piece and delimits:
a distal part of the internal conduit and the front mouth, and
the first housings,
wherein the proximal part being configured to be joined to the distal part by fitting the distal part into the proximal part, in an assembled configuration of the body wherein no surface of the proximal part longitudinally faces rearwards a surface of the distal part,
in that the fluidic coupling element further comprises a piston, a valve and a valve spring, which are housed in the internal conduit, the piston including a proximal collar flange which is longitudinally interposed between the distal part and the proximal part, whereas the valve is movable relative to the piston between:
a forward closing position, wherein the valve closes the internal conduit, and
a rear opening position, wherein the valve permits the passage of fluid into the internal conduit, the valve spring pushing the valve back toward the front closing position,
the proximal part comprising an internal groove whereas the distal part comprises an external groove that faces radially the internal groove at least partially, when the body is in the assembled configuration, and
wherein the fluidic coupling element further comprises an obstacle, which is elastically deformable and which, when the body is in the assembled configuration, is partially accommodated in the external groove of the distal part and in the internal groove of the proximal part, the obstacle being configured to cooperate with a distal axial wall of the internal groove and a proximal axial wall of the external groove so as to prevent the separation of the distal and proximal portions.

2. The fluidic coupling element according to claim 1, wherein:
the fluidic coupling element comprises at least one actuating ball, each actuating ball being respectively accommodated in a second housing provided in the distal part and being apt to be pushed into the respective second housing, by the mating end-piece during coupling of the fluidic coupling element and of the mating end-piece, so as to move the locking ring longitudinally against the locking spring:
from the advanced retaining position, where the locking ring limits the movement of each actuating ball to a position where each actuating ball protrudes radially on either side of the body and the locking ring abuts forward against at least one actuating ball or against the body, a front surface of the locking ring oriented towards the front of the body longitudinally facing the actuating ball or each actuating ball,
to the retracted unlocked position.

3. The coupling fluidic element according to claim 2, wherein:
each second housing has an elongated shape parallel to the central axis, so that each actuating ball is movable in the respective second housing during coupling of the fluidic coupling element and of the mating end-piece, following a movement comprising a longitudinal component and a radial component to the central axis.

4. The fluidic coupling element according to claim 1, wherein:
in the free state, the obstacle has a larger external maximum radial dimension than in the assembled configuration of the body.

5. The fluidic coupling element according to claim 1, wherein:
the obstacle is apt to be entirely contained in the external groove.

6. The fluidic coupling element according to claim 1, wherein:
when the obstacle is in contact with the distal axial wall of the internal groove, the obstacle is in external contact only with a cylindrical bottom surface of the internal groove,
in the assembled configuration of the body, the proximal flange of the piston is configured to limit the approach of the distal part and the proximal part to a configuration where the obstacle is in external contact only with the cylindrical bottom surface of the internal groove.

7. The fluidic coupling element according to claim 1, wherein:
the obstacle is a ring the longitudinal dimension of which is strictly greater than a radial thickness of the ring in the free state.

8. The fluidic coupling element according to claim 1, wherein:
the obstacle is a split ring.

9. The fluidic coupling element according to claim 1, wherein:
no surface of the locking ring longitudinally faces rearwards from a surface of the distal part,
in the advanced retaining position, the locking ring is directly or indirectly in front abutment against the body, and
a distal wall of the external groove is shifted rearwards relative to a rear end surface of the locking ring when the locking ring is in the advanced retaining position.

10. The fluidic coupling element according to claim 1, wherein:
the fluidic coupling member comprises a first seal radially interposed between the distal part and the proximal part, and
the obstacle is arranged at the front with respect to the first seal in the assembled configuration of the body.

11. The fluidic coupling element according to claim 1, wherein the fluidic coupling element comprises:
a spacer ring which is longitudinally interposed between the distal part and the proximal collar flange of the piston and engaged with reduced radial play in the distal part,
a second seal which cooperates with the valve in the closing position and which is housed in a second seal housing delimited by:
a distal wall of the distal part,
a bottom surface of the distal part and
a front end axial surface of the spacer ring.

12. The fluidic coupling element according to claim 1, wherein:
the piston comprises, in addition to the proximal collar flange, a distal head which is radially opposite the valve in the forward closing position, a third seal being interposed radially between the distal head and the valve in the front closing position, the piston is in one-piece, the valve has a minimum internal radial dimension that is greater than a maximum external radial dimension of the distal head.

13. The fluidic coupling element according to claim 1, wherein the proximal part delimits at least one first internal radial surface at which the internal groove is formed, and wherein a longitudinal dimension of the internal radial surface in front of the internal groove is greater than a length of the external groove.

14. The fluidic coupling element according to claim 1, wherein:

the locking ring is partially arranged around the proximal part of the body; and the locking ring spring is interposed between the proximal part and the locking ring.

15. A fluidic coupling, comprising:

the fluidic coupling element according to claim 1, and the mating end-piece, wherein the mating end-piece comprises:

a locking groove which is suitable for accommodating each locking ball in the locking position in a coupled configuration of the fluidic coupling.

* * * * *